US011464319B2

(12) United States Patent
Barron et al.

(10) Patent No.: US 11,464,319 B2
(45) Date of Patent: Oct. 11, 2022

(54) AUGMENTED REALITY BEAUTY PRODUCT TUTORIALS

(71) Applicant: Snap Inc., Santa Monica, CA (US)

(72) Inventors: Christine Barron, Los Angeles, CA (US); Virginia Drummond, Venice, CA (US); Jean Luo, Los Angeles, CA (US); Alek Matthiessen, Marina Del Rey, CA (US); Celia Nicole Mourkogiannis, Los Angeles, CA (US); Jonathan Solichin, Arcadia, CA (US); Olesia Voronova, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 17 days.

(21) Appl. No.: 17/301,090

(22) Filed: Mar. 24, 2021

(65) Prior Publication Data

US 2021/0298458 A1 Sep. 30, 2021

Related U.S. Application Data

(60) Provisional application No. 63/002,883, filed on Mar. 31, 2020.

(51) Int. Cl.
*A45D 44/00* (2006.01)
*G06F 3/04817* (2022.01)
(Continued)

(52) U.S. Cl.
CPC ....... *A45D 44/005* (2013.01); *G06F 3/04817* (2013.01); *G06F 3/04842* (2013.01);
(Continued)

(58) Field of Classification Search
CPC .................................................. A45D 44/005
(Continued)

(56) References Cited

U.S. PATENT DOCUMENTS 5,754,939 A * 5/1998 Herz ..................... H04N 21/454
348/E7.071
6,038,295 A * 3/2000 Mattes .................... H04N 7/147
348/211.3
(Continued)

FOREIGN PATENT DOCUMENTS

CA 2887596 7/2015
WO 2012000107 1/2012
(Continued)

OTHER PUBLICATIONS

"[YouCam Makeup] AI Look Transfer" available online at <https://www.youtube.com/watch?v=wKKDtQ00uks>, published on Nov. 9, 2017 (Year: 2017).*
(Continued)

*Primary Examiner* — Reza Nabi
(74) *Attorney, Agent, or Firm* — Schwegman Lundberg & Woessner, P.A.

(57) ABSTRACT

Systems, methods, and computer readable media for augmented reality beauty product tutorials are disclosed. Methods disclose displaying on a first portion of a screen a beauty product tutorial including pre-recorded images of a presenter applying a beauty product to a body part of the presenter and determining first effects indicating changes to make to live images of a user to simulate applying the beauty product to the body part of the user, where the first effects are determined based on second effects indicating changes to the pre-recorded images from applying the beauty product to the body part of the presenter. Methods further disclose processing the live images of the user to add the first effects and indications of motion of the beauty product and displaying the processed live images of the user on a second portion of the screen.

17 Claims, 25 Drawing Sheets

(51) Int. Cl.
  *G06F 3/04842* (2022.01)
  *G06Q 30/06* (2012.01)
  *G06T 11/00* (2006.01)
  *G09B 19/00* (2006.01)
(52) U.S. Cl.
  CPC ........ *G06Q 30/0601* (2013.01); *G06T 11/001* (2013.01); *G09B 19/003* (2013.01); *G06T 2200/24* (2013.01)
(58) Field of Classification Search
  USPC ........................................................ 434/100
  See application file for complete search history.

(56) References Cited

U.S. PATENT DOCUMENTS

| | | | | |
|---|---|---|---|---|
| 6,158,044 | A * | 12/2000 | Tibbetts | G06F 9/465 707/999.001 |
| 6,167,435 | A * | 12/2000 | Druckenmiller | G06F 16/9535 709/224 |
| 6,205,432 | B1 * | 3/2001 | Gabbard | G06Q 30/02 705/1.1 |
| 6,310,694 | B1 * | 10/2001 | Okimoto | G06F 3/1204 358/437 |
| 6,484,196 | B1 * | 11/2002 | Maurille | H04L 51/04 370/260 |
| 6,487,586 | B2 * | 11/2002 | Ogilvie | H04L 51/18 709/201 |
| 6,665,531 | B1 * | 12/2003 | Soderbacka | H04W 4/14 455/418 |
| 6,701,347 | B1 * | 3/2004 | Ogilvie | G06Q 10/107 709/202 |
| 6,711,608 | B1 * | 3/2004 | Ogilvie | G06Q 10/107 709/202 |
| 6,757,713 | B1 * | 6/2004 | Ogilvie | G06Q 10/107 709/202 |
| 6,980,909 | B2 * | 12/2005 | Root | H04L 67/52 702/3 |
| 7,124,164 | B1 * | 10/2006 | Chemtob | H04L 12/1822 709/204 |
| 7,149,893 | B1 * | 12/2006 | Leonard | H04L 51/48 709/217 |
| 7,173,651 | B1 * | 2/2007 | Knowles | H04N 1/32411 348/207.1 |
| 7,243,163 | B1 * | 7/2007 | Friend | G06F 15/16 709/248 |
| 7,278,168 | B1 * | 10/2007 | Chaudhury | H04L 9/3247 713/176 |
| 7,356,564 | B2 * | 4/2008 | Hartselle | H04L 65/4025 709/200 |
| 7,376,715 | B2 * | 5/2008 | Cunningham | H04L 9/40 709/227 |
| 7,411,493 | B2 * | 8/2008 | Smith | H04W 4/024 340/539.18 |
| 7,478,402 | B2 * | 1/2009 | Christensen | G06F 9/546 709/231 |
| 7,496,347 | B2 | 2/2009 | Puranik | |
| 7,519,670 | B2 * | 4/2009 | Hagale | G06Q 10/107 709/206 |
| 7,535,890 | B2 * | 5/2009 | Rojas | H04M 3/53366 370/352 |
| 7,607,096 | B2 * | 10/2009 | Oreizy | H04L 51/043 709/204 |
| 7,703,140 | B2 * | 4/2010 | Nath | H04L 63/06 713/165 |
| 7,912,896 | B2 * | 3/2011 | Wolovitz | H04W 12/033 709/227 |
| 8,131,597 | B2 * | 3/2012 | Hudetz | G06Q 30/018 705/26.1 |
| 8,170,957 | B2 * | 5/2012 | Richard | G06Q 20/3821 705/76 |
| 8,199,747 | B2 | 6/2012 | Rojas et al. | |
| 8,214,443 | B2 | 7/2012 | Hamburg | |
| 8,238,947 | B2 | 8/2012 | Lottin et al. | |
| 8,244,593 | B2 * | 8/2012 | Klinger | G06Q 30/0603 705/26.1 |
| 8,312,097 | B1 * | 11/2012 | Siegel | H04L 51/00 713/168 |
| 8,332,475 | B2 | 12/2012 | Rosen et al. | |
| 8,570,907 | B2 * | 10/2013 | Garcia, Jr. | H04L 65/403 370/259 |
| 8,718,333 | B2 * | 5/2014 | Wolf | G06T 3/0012 382/118 |
| 8,724,622 | B2 | 5/2014 | Rojas | |
| 8,745,132 | B2 | 6/2014 | Obradovich | |
| 8,874,677 | B2 | 10/2014 | Rosen et al. | |
| 8,909,679 | B2 | 12/2014 | Root et al. | |
| 8,909,714 | B2 * | 12/2014 | Agarwal | G06Q 10/107 709/206 |
| 8,909,725 | B1 * | 12/2014 | Sehn | H04L 51/08 709/206 |
| 8,914,752 | B1 * | 12/2014 | Spiegel | H04W 4/12 715/256 |
| 8,995,433 | B2 | 3/2015 | Rojas | |
| 9,040,574 | B2 | 5/2015 | Wang et al. | |
| 9,055,416 | B2 | 6/2015 | Rosen et al. | |
| 9,083,770 | B1 * | 7/2015 | Drose | H04L 43/0894 |
| 9,094,137 | B1 * | 7/2015 | Sehn | G06Q 30/0276 |
| 9,100,806 | B2 | 8/2015 | Rosen et al. | |
| 9,100,807 | B2 | 8/2015 | Rosen et al. | |
| 9,113,301 | B1 | 8/2015 | Spiegel et al. | |
| 9,148,424 | B1 * | 9/2015 | Yang | H04L 63/083 |
| 9,191,776 | B2 | 11/2015 | Root et al. | |
| 9,204,252 | B2 | 12/2015 | Root | |
| 9,225,805 | B2 | 12/2015 | Kujawa et al. | |
| 9,225,897 | B1 * | 12/2015 | Sehn | G06T 11/60 |
| 9,237,202 | B1 | 1/2016 | Sehn | |
| 9,264,463 | B2 | 2/2016 | Rubinstein et al. | |
| 9,276,886 | B1 * | 3/2016 | Samaranayake | G06F 3/04847 |
| 9,294,425 | B1 * | 3/2016 | Son | H04L 51/216 |
| 9,385,983 | B1 * | 7/2016 | Sehn | H04L 51/52 |
| 9,396,354 | B1 | 7/2016 | Murphy et al. | |
| 9,407,712 | B1 | 8/2016 | Sehn | |
| 9,407,816 | B1 | 8/2016 | Sehn | |
| 9,430,783 | B1 | 8/2016 | Sehn | |
| 9,443,227 | B2 | 9/2016 | Evans et al. | |
| 9,482,882 | B1 | 11/2016 | Hanover et al. | |
| 9,482,883 | B1 * | 11/2016 | Meisenholder | G02C 5/146 |
| 9,489,661 | B2 | 11/2016 | Evans et al. | |
| 9,491,134 | B2 | 11/2016 | Rosen et al. | |
| 9,532,171 | B2 | 12/2016 | Allen et al. | |
| 9,537,811 | B2 | 1/2017 | Allen et al. | |
| 9,560,006 | B2 | 1/2017 | Prado et al. | |
| 9,628,950 | B1 * | 4/2017 | Noeth | H04W 4/021 |
| 9,652,896 | B1 * | 5/2017 | Jurgenson | G06T 13/80 |
| 9,659,244 | B2 * | 5/2017 | Anderton | G06K 7/1417 |
| 9,693,191 | B2 | 6/2017 | Sehn | |
| 9,705,831 | B2 | 7/2017 | Spiegel | |
| 9,742,713 | B2 | 8/2017 | Spiegel et al. | |
| 9,785,796 | B1 | 10/2017 | Murphy et al. | |
| 9,825,898 | B2 | 11/2017 | Sehn | |
| 9,854,219 | B2 * | 12/2017 | Sehn | H04M 1/72403 |
| 9,961,520 | B2 * | 5/2018 | Brooks | H04L 51/224 |
| 10,324,739 | B2 * | 6/2019 | Chou | G06T 11/001 |
| 10,553,006 | B2 * | 2/2020 | Iglehart | G06F 3/04845 |
| 11,290,687 | B1 * | 3/2022 | Becchetti | H04L 12/1822 |
| 2002/0047868 | A1 * | 4/2002 | Miyazawa | H04L 51/58 715/835 |
| 2002/0144154 | A1 * | 10/2002 | Tomkow | H04L 51/23 726/1 |
| 2003/0052925 | A1 * | 3/2003 | Daimon | G06Q 10/109 715/810 |
| 2003/0126215 | A1 * | 7/2003 | Udell | H04L 51/18 709/206 |
| 2003/0217106 | A1 * | 11/2003 | Adar | G09B 7/00 709/224 |
| 2004/0203959 | A1 * | 10/2004 | Coombes | H04M 1/72436 455/466 |
| 2005/0097176 | A1 * | 5/2005 | Schatz | H04L 51/23 709/206 |

(56) References Cited

U.S. PATENT DOCUMENTS

| | | | |
|---|---|---|---|
| 2005/0198128 A1* | 9/2005 | Anderson | G06F 40/166 709/204 |
| 2005/0223066 A1* | 10/2005 | Buchheit | G06F 16/24 709/217 |
| 2006/0242239 A1* | 10/2006 | Morishima | G06Q 10/107 709/204 |
| 2006/0270419 A1* | 11/2006 | Crowley | H04M 3/42 455/456.2 |
| 2007/0038715 A1* | 2/2007 | Collins | G06F 3/1423 709/206 |
| 2007/0064899 A1* | 3/2007 | Boss | H04L 51/04 379/201.01 |
| 2007/0073823 A1* | 3/2007 | Cohen | G06Q 10/107 709/207 |
| 2007/0214216 A1* | 9/2007 | Carrer | H04L 12/1827 709/204 |
| 2007/0233801 A1* | 10/2007 | Eren | G06Q 10/107 709/207 |
| 2008/0055269 A1* | 3/2008 | Lemay | H04M 1/72436 345/169 |
| 2008/0120409 A1* | 5/2008 | Sun | H04L 67/62 709/224 |
| 2008/0207176 A1* | 8/2008 | Brackbill | H04M 1/72433 455/413 |
| 2008/0270938 A1* | 10/2008 | Carlson | G06Q 10/10 715/810 |
| 2008/0306826 A1* | 12/2008 | Kramer | G06Q 30/0226 705/14.27 |
| 2008/0313346 A1 | 12/2008 | Kujawa et al. | |
| 2009/0042588 A1* | 2/2009 | Lottin | H04L 51/234 455/466 |
| 2009/0132453 A1* | 5/2009 | Hangartner | H04L 65/612 707/999.005 |
| 2010/0082427 A1* | 4/2010 | Burgener | G06Q 30/0251 705/14.49 |
| 2010/0131880 A1 | 5/2010 | Lee et al. | |
| 2010/0185665 A1* | 7/2010 | Horn | H04L 51/18 707/769 |
| 2010/0306669 A1 | 12/2010 | Della Pasqua | |
| 2011/0099507 A1* | 4/2011 | Nesladek | G01C 21/3661 345/173 |
| 2011/0145564 A1* | 6/2011 | Moshir | H04W 12/02 713/154 |
| 2011/0202598 A1 | 8/2011 | Evans et al. | |
| 2011/0213845 A1* | 9/2011 | Logan | H04L 51/18 709/206 |
| 2011/0286586 A1 | 11/2011 | Saylor et al. | |
| 2011/0320373 A1* | 12/2011 | Lee | H04L 51/52 715/758 |
| 2012/0028659 A1* | 2/2012 | Whitney | H04M 1/7243 455/466 |
| 2012/0184248 A1* | 7/2012 | Speede | H04W 12/06 455/411 |
| 2012/0209921 A1* | 8/2012 | Adafin | H04L 51/23 709/206 |
| 2012/0209924 A1 | 8/2012 | Evans et al. | |
| 2012/0254325 A1 | 10/2012 | Majeti et al. | |
| 2012/0278692 A1* | 11/2012 | Shi | H04L 67/568 715/205 |
| 2012/0304080 A1* | 11/2012 | Wormald | H04L 51/04 715/758 |
| 2013/0071093 A1* | 3/2013 | Hanks | H04N 5/76 386/295 |
| 2013/0194301 A1* | 8/2013 | Robbins | G06F 21/10 345/629 |
| 2013/0290443 A1 | 10/2013 | Collins et al. | |
| 2014/0032682 A1* | 1/2014 | Prado | H04L 51/214 709/213 |
| 2014/0122787 A1* | 5/2014 | Shalvi | G06F 3/0688 711/113 |
| 2014/0201527 A1* | 7/2014 | Krivorot | H04L 63/0428 713/168 |
| 2014/0282096 A1* | 9/2014 | Rubinstein | G06Q 50/01 715/753 |
| 2014/0325383 A1* | 10/2014 | Brown | G06F 3/0486 715/748 |
| 2014/0359024 A1* | 12/2014 | Spiegel | H04L 51/216 709/206 |
| 2014/0359032 A1* | 12/2014 | Spiegel | H04L 51/216 709/206 |
| 2015/0199082 A1 | 7/2015 | Scholler et al. | |
| 2015/0227602 A1* | 8/2015 | Ram | G06F 11/1456 707/634 |
| 2015/0365627 A1* | 12/2015 | Deng | G06T 13/80 348/14.07 |
| 2016/0085773 A1* | 3/2016 | Chang | G06F 3/04842 715/753 |
| 2016/0085863 A1 | 3/2016 | Allen et al. | |
| 2016/0086670 A1* | 3/2016 | Gross | G11C 16/0483 365/185.24 |
| 2016/0099901 A1* | 4/2016 | Allen | G06F 3/04883 709/206 |
| 2016/0180887 A1 | 6/2016 | Sehn | |
| 2016/0277419 A1* | 9/2016 | Allen | H04L 51/52 |
| 2016/0321708 A1 | 11/2016 | Sehn | |
| 2016/0359957 A1 | 12/2016 | Laliberte | |
| 2016/0359987 A1* | 12/2016 | Laliberte | H04W 12/08 |
| 2017/0161382 A1* | 6/2017 | Ouimet | G06F 16/434 |
| 2017/0263029 A1* | 9/2017 | Yan | G06F 3/04845 |
| 2017/0287006 A1* | 10/2017 | Azmoodeh | G06Q 30/0261 |
| 2017/0295250 A1* | 10/2017 | Samaranayake | H04L 67/535 |
| 2017/0374003 A1 | 12/2017 | Allen et al. | |
| 2017/0374508 A1* | 12/2017 | Davis | G06F 16/48 |
| 2018/0075523 A1* | 3/2018 | Sartori Odizzio | G06Q 30/0643 |
| 2018/0075524 A1* | 3/2018 | Sartori Odizzio | G06F 3/04845 |
| 2019/0014884 A1* | 1/2019 | Fu | G06V 20/20 |
| 2021/0259517 A1* | 8/2021 | Ubbesen | A61B 1/05 |
| 2021/0298458 A1* | 9/2021 | Barron | G06F 3/04817 |
| 2021/0304517 A1* | 9/2021 | Barron | G06T 19/006 |
| 2021/0304629 A1* | 9/2021 | Barron | G06T 19/006 |
| 2021/0358181 A1* | 11/2021 | Suzuki | H04N 21/41 |
| 2021/0383460 A1* | 12/2021 | Sartori Odizzio | G06Q 30/0623 |
| 2021/0390311 A1* | 12/2021 | Barron | G06T 19/20 |
| 2022/0150287 A1* | 5/2022 | Kasaba | H04N 7/157 |

FOREIGN PATENT DOCUMENTS

| | | |
|---|---|---|
| WO | 2013008251 | 1/2013 |
| WO | 2014194262 | 12/2014 |
| WO | 2015192026 | 12/2015 |
| WO | 2016054562 | 4/2016 |
| WO | 2016065131 | 4/2016 |
| WO | 2016/112299 | 7/2016 |
| WO | 2016179166 | 11/2016 |
| WO | 2016179235 | 11/2016 |
| WO | 2017176739 | 10/2017 |
| WO | 2017176992 | 10/2017 |
| WO | 2018005644 | 1/2018 |
| WO | 2021203120 | 10/2021 |

OTHER PUBLICATIONS

Mohr et al., "Retargeting video tutorials showing tools with surface contact to augmented reality", May 11, 2017 (Year: 2017).*

Castelluccia, Claude, "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible for", [Online] Retrieved from the

(56) References Cited

OTHER PUBLICATIONS

Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

"International Application Serial No. PCT US2021 070304, International Search Report dated Jul. 13, 2021", 4 pages.

"International Application Serial No. PCT US2021 070304, Written Opinion dated Jul. 13, 2021", 8 pages.

"[YouCam Makeup] AI Look Transfer", YouCam Makeup: Selfie Makeovers App, Retrieved from the Internet:URL: https: www.youtube.com watch?v=wKKDtQOOuks[retrieved on Jun. 30, 2021], (Nov. 10, 2017).

\* cited by examiner

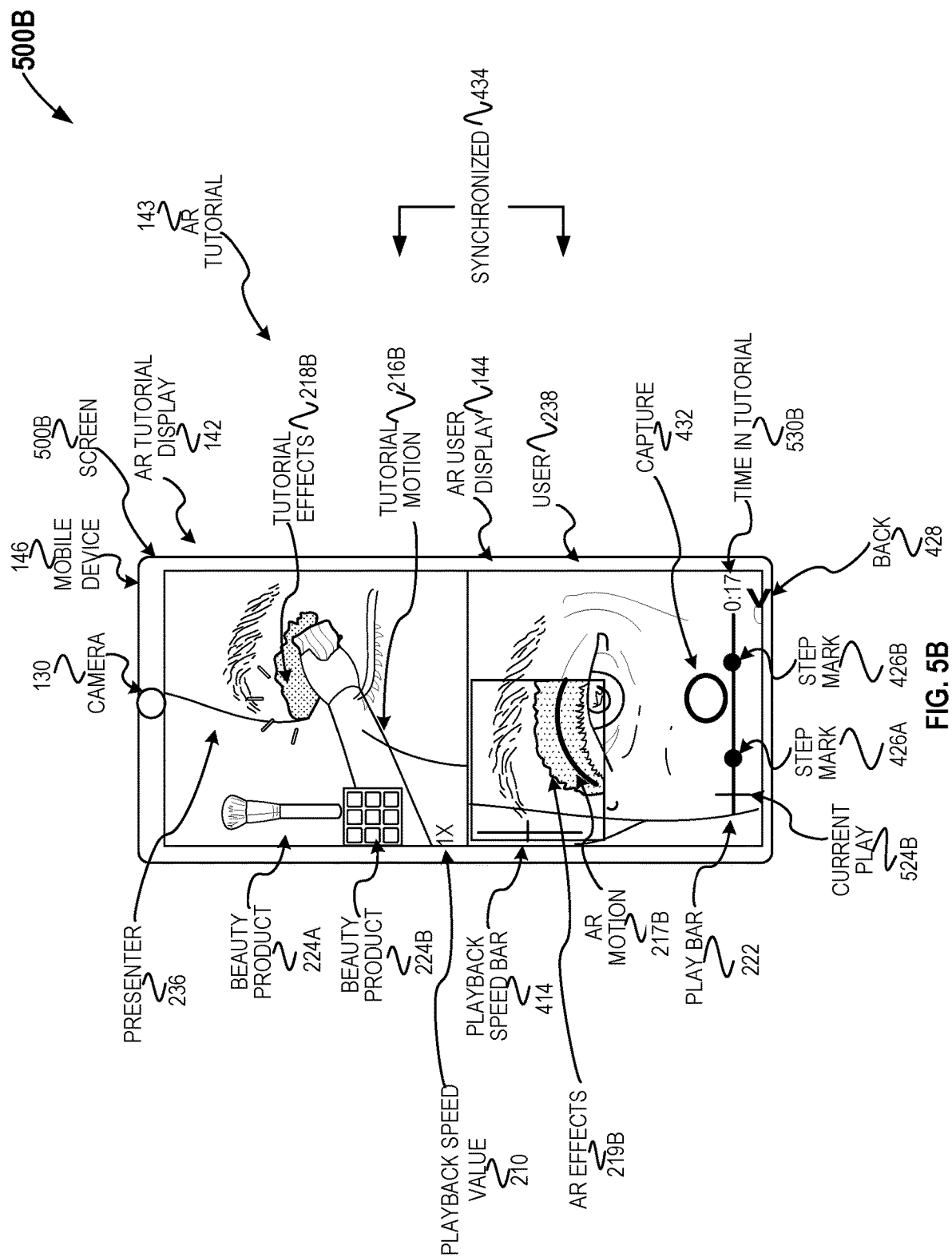

AUGMENTED REALITY BEAUTY PRODUCT TUTORIALS

CLAIM OF PRIORITY

This application claims the benefit of priority to U.S. Provisional Application Ser. No. 63/002,883, filed on Mar. 31, 2020, which is incorporated herein by reference in its entirety.

BACKGROUND

The application of beauty products has become more and more complicated. Often there are multiple steps in applying a beauty product. Additionally, often it is not obvious to the user of the beauty product how to apply the beauty products. Users of beauty products often rely on going to salons or beauty counters for help in applying beauty products, but this may be expensive, or it may be difficult to get a person that is experienced in a particular beauty product. Moreover, applying a beauty product may be both expensive and time consuming and the user may be disappointed in the results.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 5A, 5B, and 5C illustrate the operation of an AR tutorial, in accordance with some embodiments.

DETAILED DESCRIPTION

An augmented reality (AR) application enables a user (e.g., presenter) to edit and prepare a beauty product AR tutorial for a user of the AR tutorial. The presenter may create an AR tutorial with multiple steps where different beauty products are used in different steps. The AR tutorial provides a dual screen view with a recorded version of the presenter on one screen and a live view of the user on the other screen.

The AR tutorial determines a body part of the presenter where the beauty product is being used and matches that to a body part of the user. For example, if the presenter is applying eye shadow, then the body part is the eye. The AR tutorial will zoom to the eye of the user of the AR tutorial. The AR tutorial determines the effects of the beauty product on the presenter. For example, if the presenter is applying eye shadow, then the AR tutorial determines the change in the color to the presenter's skin around the eye. The AR tutorial also determines the motion the presenter used to apply the beauty product. For example, the motion of a brush around the presenter's eye to apply the eye shadow.

The AR tutorial applies the effects to the live view of the user on the other screen. For example, AR tutorial will change the color of the skin around the eye of the user. Additionally, the AR tutorial indicates the motion the presenter used in applying the beauty product on the body part of the user. For example, the AR tutorial may illustrate the movement of a brush on the presenter with white lines around the user's eye. The AR tutorial will synchronize the illustration of the effects and movement on the live view of the user with the application of the beauty product by the presenter.

The user of the AR tutorial may be able to customize the beauty product. For example, the user may be able to use a different color of eye shadow. The user of the AR tutorial is offered an opportunity to purchase the beauty products. In an example, the AR tutorial provides a tool such as a media overlay that allows the user to preview the end results of the AR tutorial on the live view of the user before the user starts the AR tutorial.

Figure 1:
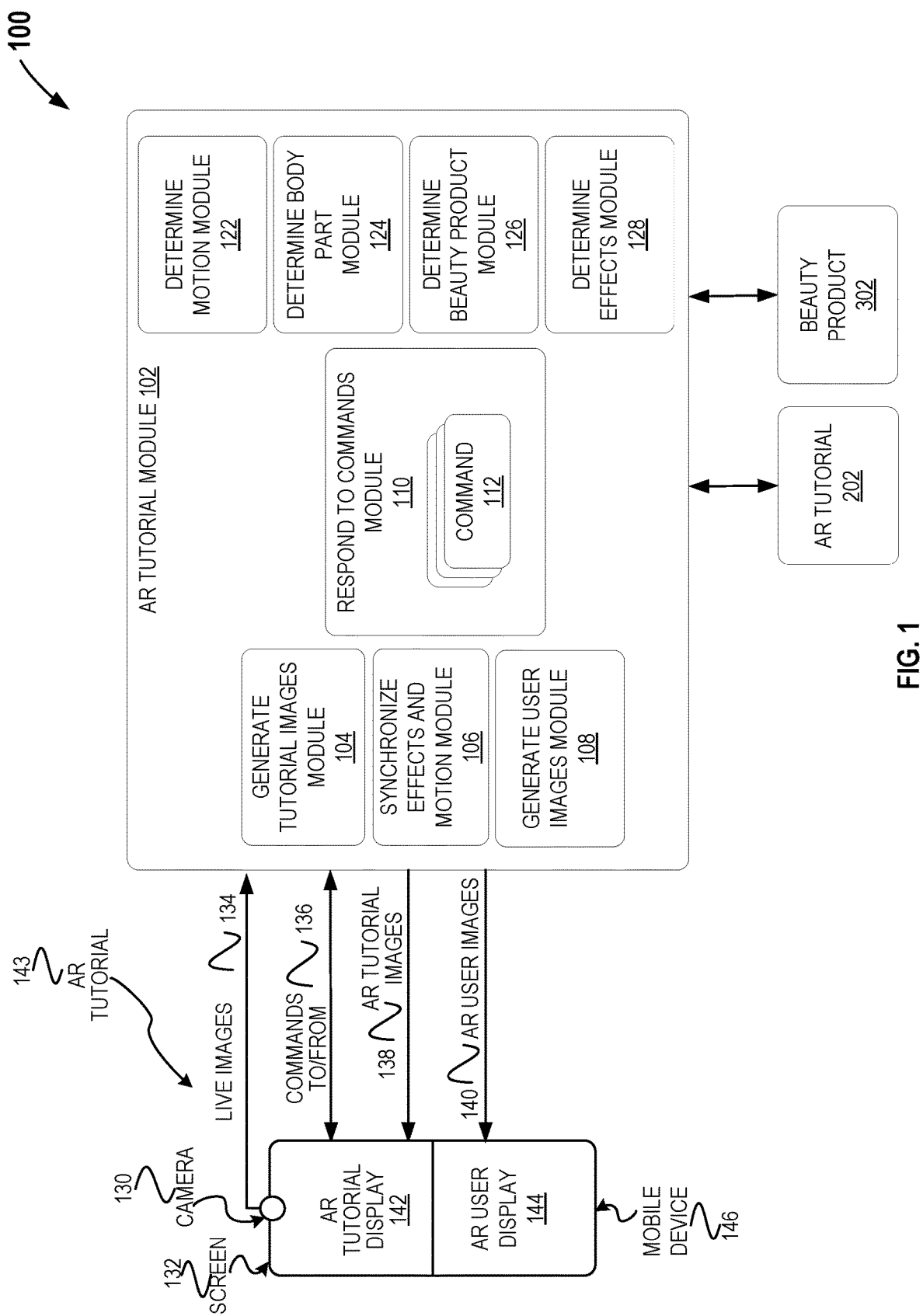
FIG. 1 illustrates an augmented reality (AR) tutorial system, in accordance with some embodiments.
Figure 2:
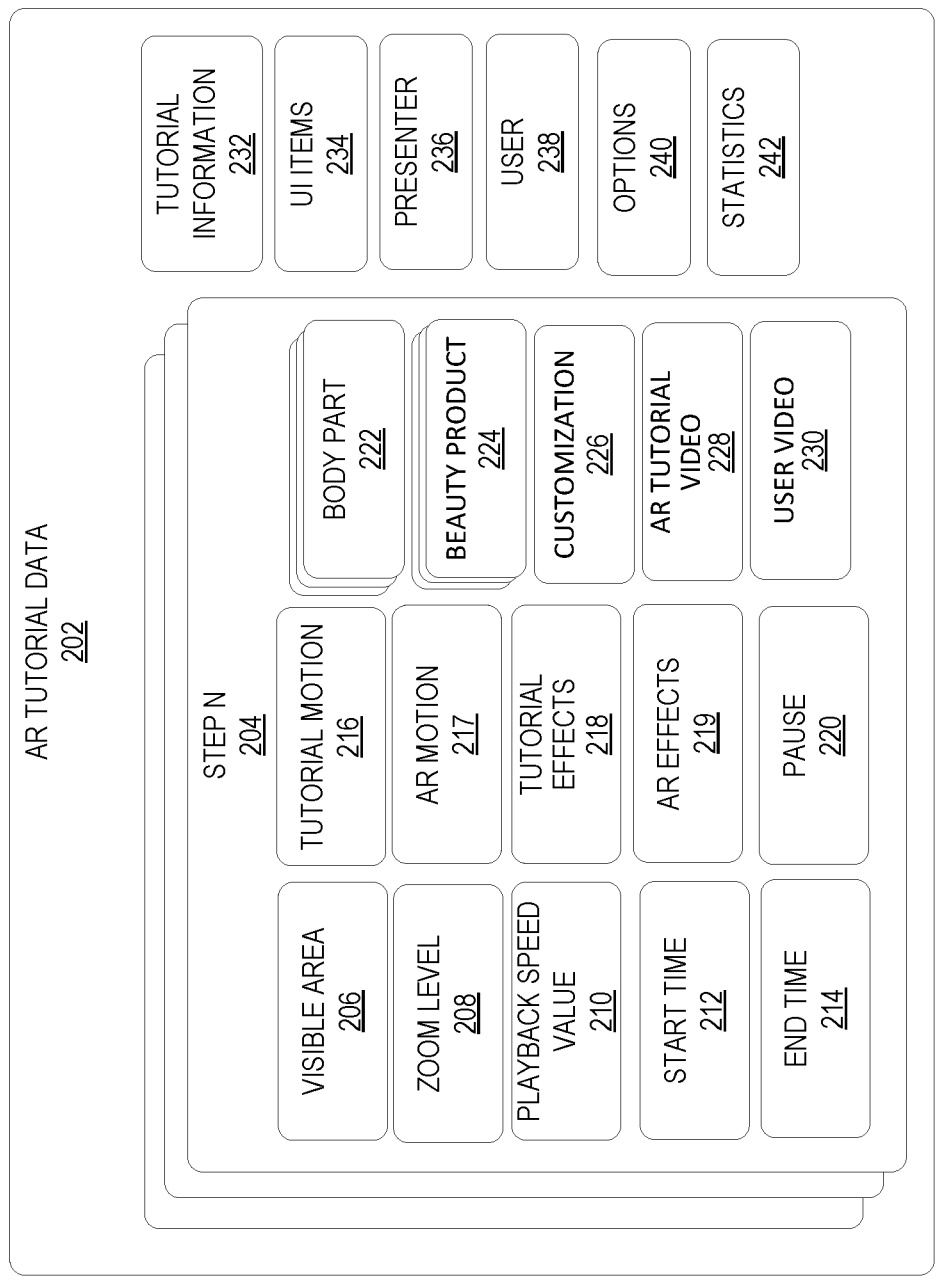
FIG. 2 illustrates components of AR tutorial data, in accordance with some embodiments.
Figure 3:
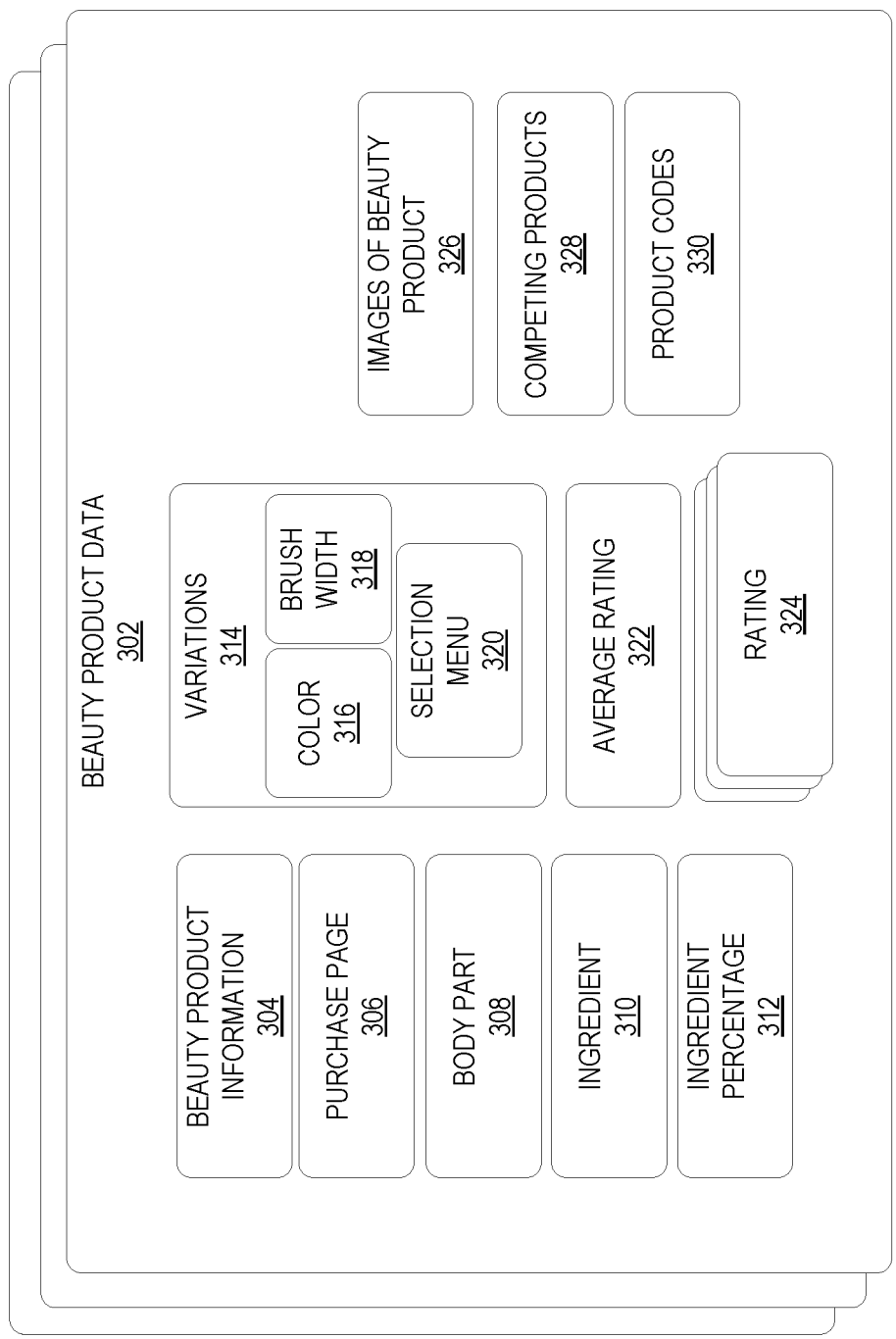
FIG. 3 illustrates components of beauty product data, in accordance with some embodiments.
Figure 4:
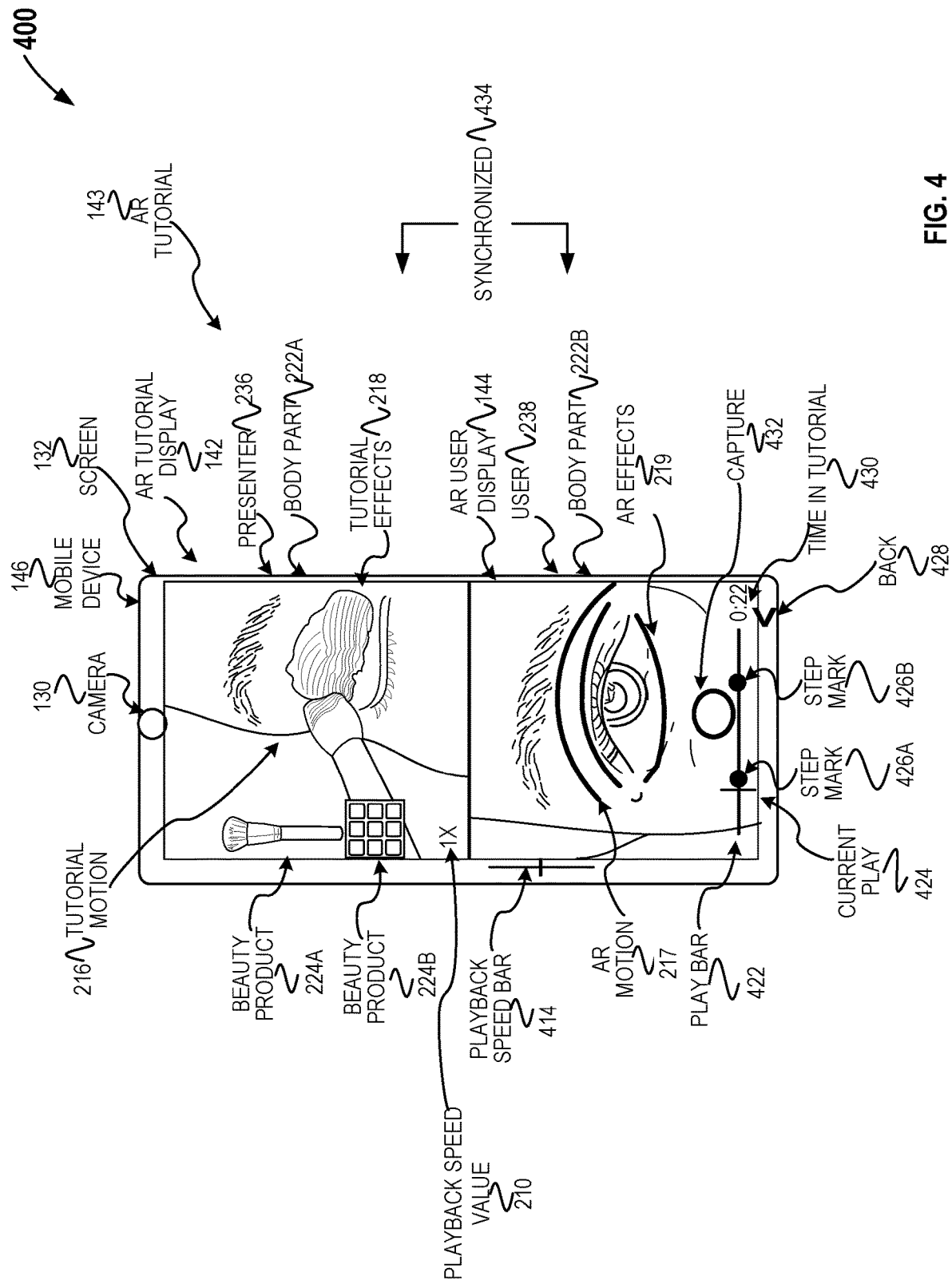
FIG. 4 illustrates the operation of an AR tutorial system, in accordance with some embodiments.

FIGS. 1-4 are disclosed in conjunction with one another. FIG. 1 illustrates an augmented reality (AR) tutorial system 100, in accordance with some embodiments. FIG. 2 illustrates components of AR tutorial data 202, in accordance with some embodiments. FIG. 3 illustrates components of beauty product data 302, in accordance with some embodiments. FIG. 4 illustrates the operation 400 of an AR tutorial system, in accordance with some embodiments.

The AR tutorial module 102 is configured to generate an AR tutorial 143. In one example, the AR tutorial module 102 is part of a computing system, such as AR tutorial server system 1808 shown in FIG. 18. In some embodiments, the functionality of AR tutorial module 102 is implemented with machine 2100 and/or an apparatus or portion of machine 2100. The AR tutorial module 102 sends to and receives commands 112 from a mobile device 146, such as commands to/from 136. The AR tutorial module 102 receives live images 134 from the mobile device 146 and generates AR tutorial images 138 and AR user images 140 based on AR tutorial data 202 and beauty product data 302. The AR tutorial module 102 is configured to generate an AR tutorial images 138, an AR user images 140, an AR tutorial data 202, and/or a beauty product data 302. The AR tutorial module 102 is configured to be executed by one or more processors of the mobile device 146, in accordance with some embodiments. The AR tutorial module 102 is configured to cause the rendering of the AR tutorial display 142 and/or the AR user display 144, in accordance with some embodiments. Live images 134 are received by the AR tutorial module 102, from the camera 130, in accordance with some embodiments.

Mobile device 146 is a mobile computing device such as a smart phone, watch, tablet, glasses, or other portable computing device. Mobile device 146 is a client device 1802 as disclosed in conjunction with FIG. 18, in accordance with some embodiments. Mobile device 146 is a machine 2100, in accordance with some embodiments. In some embodiments the mobile device 146 is a wireless device in communication with a wireless communication network, such as LTE, 5G, 3GPP or Institute of Electrical and Electronic Engineering (IEEE) 802.11, and so forth. In some embodiments the mobile device 146 is a laptop computer or desktop computer. The camera 130 is an environmental component 2132, in accordance with some embodiments. The screen 132 is a display screen of the mobile device 146. The screen 132 is a user output component 2124 and/or a user input component 2126, in accordance with some embodiments. The screen 132 is a portion of AR glasses or a projection on an eye or eyes of a user of AR tutorial 143, in accordance with some embodiments. In some embodiments screen 132 is used to refer to the user interface provided on the screen 132. Full screen indicates that AR user display 144 or AR tutorial display 142 occupies both the screen 132 portion of AR user display 144 or AR tutorial display 142 and all of or part of the AR tutorial display 142 or AR user display, respectively, in accordance with some embodiments.

Commands to/from 136 are commands 112 to the AR tutorial module 102 from the mobile device 146 and commands 112 sent from the AR tutorial module 102 to the mobile device 146. Live images 134 are images from the camera 130, which may be a single image or a series of images of a video. AR tutorial display 142 is the portion of the screen 132 where the AR tutorial images 138 are presented. AR user display 144 is the portion of the screen 132 where AR user images 140 is displayed. As illustrated, the AR tutorial display 142 is shown in a top portion of the screen; however, it is to be understood that the AR tutorial display 142 could be shown in the bottom portion of the screen, or on a side portion of the screen, in example embodiments. Additionally, other information may be displayed on the screen 132. In some embodiments, one of AR tutorial display 142 and/or AR user display 144 may be displayed in a full screen of screen 132. In some embodiments, information may be considered on top, under, to left, or to the right eye of the screen 132, and may be accessed by a command 112 such as a swipe from the user 238 of FIG. 2.

Figure 5A:
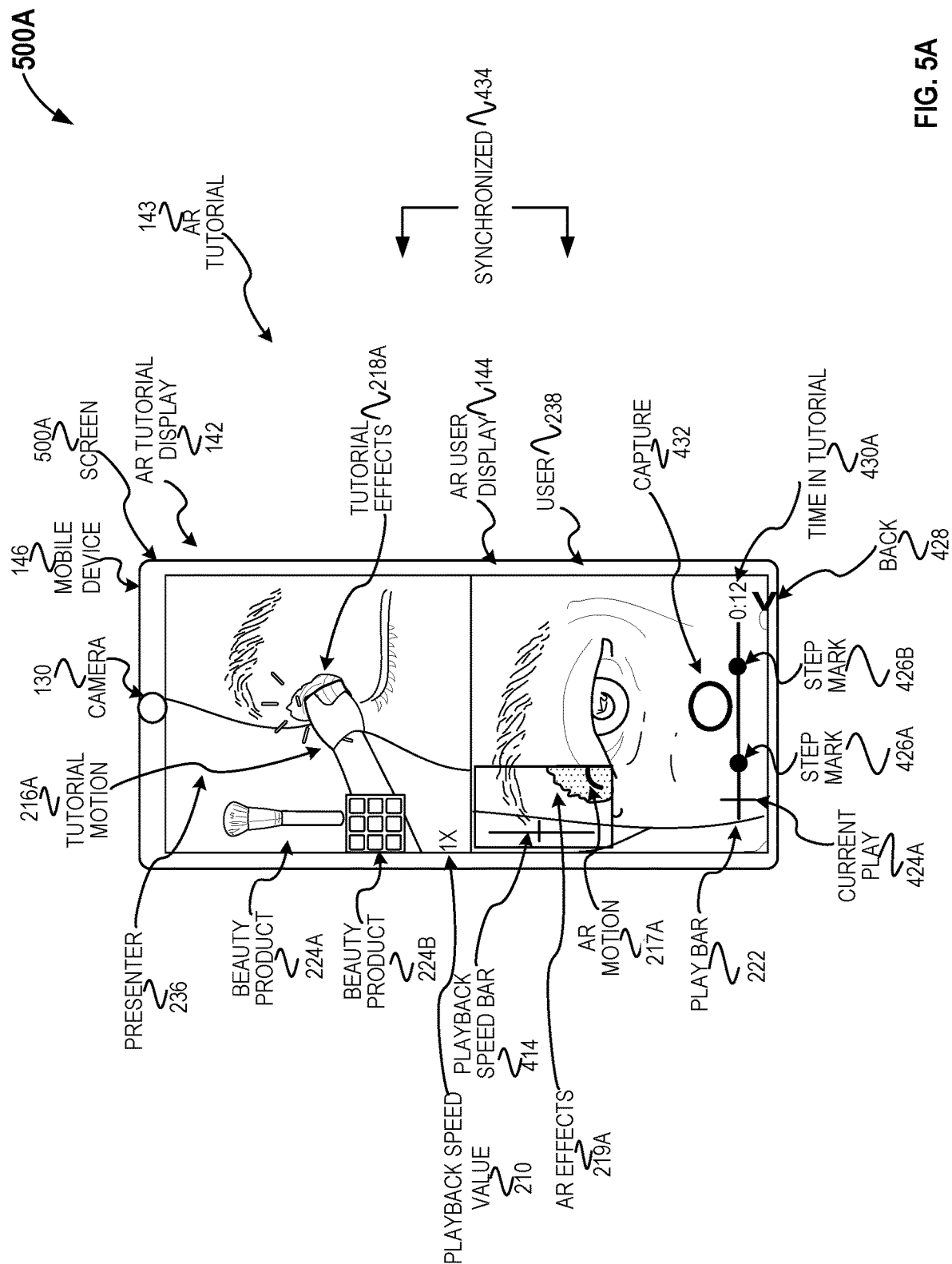
Figure 5C:
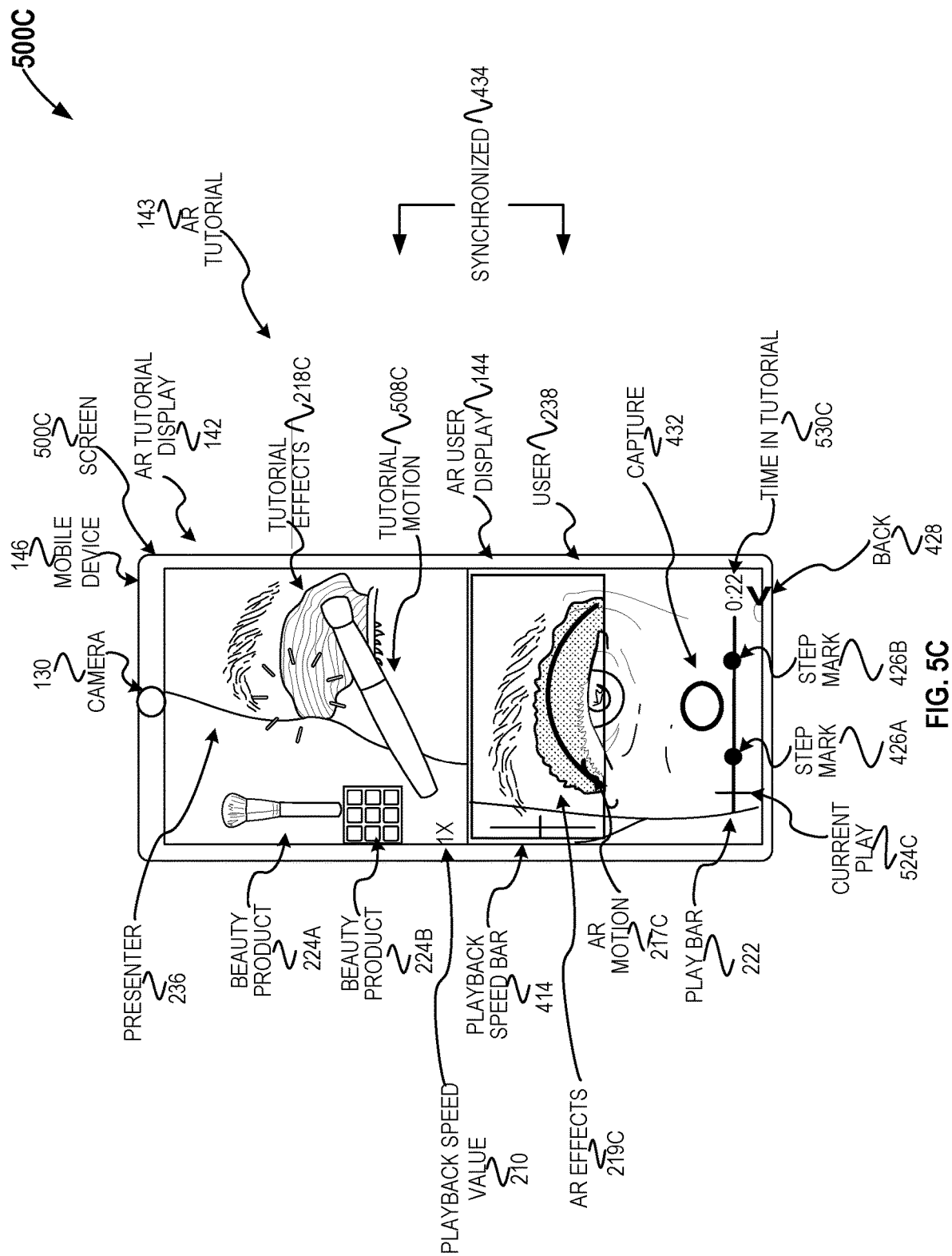

Determine motion module 122 extracts tutorial motion 216 from the AR tutorial video 228. Determine motion module 122 generates AR motion 217 from the tutorial motion 216 of the AR tutorial video 228, in accordance with some embodiments. In some embodiments, determine motion module 122 generates tutorial motion 216 from live images 134. For example, as an AR tutorial video 228 is being captured the determine motion module 122 extracts tutorial motion 216. Determine motion module 122 may be configured to determine tutorial motion 216 based on object recognition where images of beauty product 224 of FIG. 2, tutorial effects 218, and/or a body part 222 are identified in the live images 134 and/or AR tutorial video 228. Determine motion module 122 compares successive images to determine the difference between the images, in accordance with some embodiments. For example, as illustrated in FIGS. 5A, 5B, and 5C, determine motion module 122 detects the movement of the beauty product 224B, from screen 500A to screen 500B and then from screen 500B to screen 500C. The result may be a measure of an amount of movement of the beauty product 224A for a number of images. In some embodiments, determine motion module 122 compares successive images of the AR tutorial video 228, which is being played on the screens 500A, 500B, and 500C. Object recognition is used to determine the location of the beauty product 224B within the images of the AR tutorial video 228 and then a difference in position is calculated. For example, a number of pixels of movement of the beauty product 224B may be determined from screen 500A to screen 500B. As an example, data of tutorial motion 216 may include 2 pixels to the right for a difference between two successive images of the AR tutorial video 228.

In some embodiments, determine motion module 122 determines the motion of the presenter 236 to determine how the beauty product 224 is applied to the presenter 236. Determine motion module 122 uses a neural network to identify different portions of the images of AR tutorial video 228, in accordance with some embodiments. Determine motion module 122 uses a neural network to determine a difference between two images and may use tutorial effects 218 to determine the motion of the beauty product 224. For example, if a new portion of an eye has a different color in a second image from a first image, then the tutorial motion 216 may be determined to include a position of the beauty product 224 in a first image position of AR tutorial video 228 to a position in a second image that would enable the presenter 236 to apply the beauty product 224 to generate the different color between the first image and the second image.

Determine motion module 122 is configured to determine AR motion 217 from tutorial motion 216. For example, determine motion module 122 is configured to determine AR motion 217 of FIGS. 2, 4, 5A, 5B, 5C, and 12 from tutorial motion 216. FIGS. 5A, 5B, and 5C illustrate an example of adding AR motion 217A, 217B, 217C, to AR user display 140 as displayed on AR user display 144 from tutorial motion 216A, which are the indications of motion of a beauty product 224A in AR tutorial video 228. FIGS. 5A, 5B, and 5C illustrate the synchronized 434 movement of beauty product 224A, 224B, and 224C by presenter 236 with the addition of AR motion 217A, 217B, and 217C, respectively. In some embodiments, tutorial motion 216 is predetermined. In some embodiments, tutorial motion 216 indicates a number of pixels of motion and direction per image of the AR tutorial video 228.

Determine motion module 122 may determine a starting position in the live images 134 of the user 238 for the AR motion 217. Additionally, determine motion module 122 adjusts the starting point of AR motion 217 for body part 222, zoom level 208, and visible area 206. The user 238 may be moving during the playing of the AR tutorial video 228, so determine motion module 122 is configured to adjust motion indications to compensate for the motion within the live images 134 of the user 238. As an example, as disclosed in conjunction with FIG. 5A, determine motion module 122 has determined AR motion 217A based on the tutorial motion 216A for the first "0:12" seconds in the AR tutorial 143 as displayed at time in tutorial 530A. Determine motion module 122 then must determine AR motion 217B for the difference between "0:12" seconds and "0:17" seconds as displayed at time in tutorial 530B of FIG. 5B. Determine motion module 122 may determine the AR motion 217B based on a predetermined number of images or a predetermined time to generate new AR motion 217B to be displayed by generate user images module 108. In some embodiments, a fixed number of images are displayed in the AR user display 144 such as 30 frames per second and determine motion module 122 provides a movement line for each frame. A movement line may indicate pixels within the frame that should be indicated as movement. The movement line may be represented as a set of pixels, a vector, a line equation, or another representation.

Determine body part module 124 determines a body part 222 from AR tutorial video 228 and/or user video 230. In some embodiments, beauty product data 302 includes body part 308, which indicates a body part, that may be used by determine body part module 124 in determining a body part 222. In some embodiments, the presenter 236 may enter the body part 222 via a user interface (UI). In some embodiments, determine body part module 124 uses a neural network that is trained to identify different body parts from an image of a human body. Determine body part module 124 may use other information to determine which body part 222 is having the beauty product 224 applied. For example, the determine body part module 124 may determine that an eye region has changed colors in an AR tutorial video 228 or in images from live images 134 as the AR tutorial video 228 is being recorded. Determine body part module 124 is configured to identify a body part 222 from AR tutorial video 228 of the presenter 236 and use the identified body part 222 of the presenter to determine the body part 222 in the user video 230 of user 238. For example, as disclosed in conjunction with FIG. 4, the determine body part module 124 can identify body part 222A, which is a right eye, of the presenter 236 and then identify a body part 222B, which is a right eye of a user 238, in the user video 230.

Determine beauty product module 126 is configured to determine a beauty product 224. Beauty product 224 is a beauty product that is associated with beauty product data 302, in accordance with some embodiments. In some embodiments determine beauty product module 126 determines the beauty product 224 via UI screens presented to the presenter 236. In some embodiments, determine beauty product module 126 is configured to take an image of a beauty product 326 and determine the beauty product 224 based on a product code 330 on the beauty product 224 and/or based on identifying the beauty product 224 from a database of beauty products 224. For example, the determine beauty produce module 126 uses a trained neural network to perform object recognition of the beauty product 224 so that the presenter 236 does not have to enter information regarding the beauty product 224. In some embodiments, determine beauty product module 126 retrieves beauty product data 302 from a local or remote database, such as beauty products 2018 of FIG. 20. Images of beauty product 326 may be used to request confirmation from the presenter 236 and/or to display the beauty product 224, such as in FIG. 4 where two beauty products 224 are displayed as beauty product 224A and 224B.

Determine effects module 128 determines the tutorial effects 218 based on comparing images of the AR tutorial video 228. For example, determine effects module 128 may compare successive images of the AR tutorial video 228 to determine a difference between the images and determine that the difference is due to the application of the beauty product 224. Tutorial effects 218 may be data that indicates the difference between successive images due to the application of the beauty product 224, in accordance with some embodiments. Determine effects module 128 determines tutorial effects 218 using one or more of the following: tutorial motion 216, body part 222, and/or beauty product data 302 such as color 316. Determine effects module 128 may use other data to determine the tutorial effects 218. Determine effects module 128 may determine the differences between images on the body part 222 or body part 308. Body part 222 and body part 308 may indicate a same part body part. In some embodiments, body part 222 may be different than body part 308, e.g., body part 308 may be from a manufacturer, such as is included in beauty product information 304, and may indicate an eye lid, whereas body part 222 may be more generic and indicate a right eye or left eye. Body part 222 and body part 308 may be different in other ways. Determine effects module 128 may determine the differences between images on the portion of the image where motion 216 occurred between the two images of AR tutorial video 228. In some embodiments, tutorial effects 218 are predetermined. As disclosed in conjunction with FIGS. 4, 5A, 5B, 5C, 12, and 17 the determine effects module 128 determines the tutorial effects 218.

In some embodiments the determine effects module 128 is configured to determine the AR effects 219 of FIGS. 2, 4, 5A, 5B, 5C, 8, 11, 12, 13, and 14 from tutorial effects 218 and/or AR tutorial video 228. FIGS. 5A, 5B, and 5C illustrate an example of adding AR effects 219A, 219B, 219C, to a body part 222 that is a right eye of a user 238 from tutorial effects 218A, which are the changes to a right eye of a presenter 236 from applying beauty product 224B with beauty product 224A. FIGS. 5A, 5B, and 5C illustrate the progression of the application of the eye shadow where the changes to the right eye of the user 238 with the AR effects 219A, 219B, and 219C are synchronized with the changes to the right eye of the presenter 236, which are indicated by tutorial effects 218A, 218B, and 218C. In some embodiments, the determine effects module 128 uses deep learning that indicates changes to the live images 134 that should be made based on the AR tutorial video 228. In some embodiments, AR effects 219 are determined based beauty product information 304 that indicates changes that the beauty product 224 of beauty product data 302 will make to the body part 222, 308. For example, a color such as color 316 may be indicated as the change that is made to the user 238 from the application of the beauty product 224. AR effects 219 may be determined based on the color and an area of the body part 222, 306 to apply the color to the live images 134 of the user 238. In some embodiments, AR effects 219 are determined based on skin tone where a skin tone of the user 238 is determined and then the application of the beauty product 224 is determined based on the skin tone of the user 238.

The generate tutorial images module 104 generates the AR tutorial images 138. AR tutorial images 138 are used to generate the AR tutorial display 142. Generate tutorial images module 104 generates AR tutorial images 138 based on processing AR tutorial video 228. Generate tutorial images module 104 generates or plays the AR tutorial video 228 for a user 238 to take the AR tutorial 143 with the AR tutorial data 202. Generate tutorial images module 104 may process the AR tutorial video 228 to include one or more of the following: beauty product 224, play bar, such as play bar 422 of FIG. 4, playback speed bar 414, playback speed value 210, play bar 222, current play 424, step marks 426, back 428, time in tutorial 430, capture 432, UI items 234, and so forth. Generate tutorial images module 104 generates AR tutorial images 138 based on playback speed value 210, in accordance with some embodiments. Generate tutorial images module 104 generates AR tutorial images 138 based on the zoom level 208 and visible area 206. For example, the AR tutorial video 228 may include a video of a head of the presenter 236 and generate tutorial images module 104 generates or processes the AR tutorial images 138 based on the zoom level 208 and visible area 206 of the AR tutorial video 228 comprising video of the head of the presenter 236. For example, as illustrated in FIG. 4, a right eye of presenter 236 is illustrated in AR tutorial display 142, but AR tutorial video 228 may be of the whole head of the presenter 236. Generate tutorial images module 104 is configured to generate the AR tutorial images 138 as disclosed herein in conjunction with FIGS. 1-23. In some embodiments, the generate tutorial images module 104 is configured to generate AR tutorial images 138 that are related to the AR tutorial 143 prior to the user 238 entering the AR tutorial 143. For example, the generate tutorial images module 104 may generate screen 800 of FIG. 8 based on AR tutorial 606 being highlighted by capture 832, screen 900 of FIG. 9, screen 1000 of FIG. 10, and/or screen 1100 of FIG. 11, or as part of image capturing such as screen 1200B of FIG. 12, 1300 of FIG. 13, screen 1400 of FIG. 14, and/or screen 1500 of FIG. 15.

The generate user images module 108 generates AR user images 140 that are displayed in AR user display 144. The generate user images module 108 renders or generate AR user display 144, in accordance with some embodiments. The generate user images module 108 processes live images 134 to incorporate AR effects 219 and/or AR motion 217, in accordance with some embodiments. For example, AR effects 219 may indicate an area to change a color of the live images 134 as disclosed in conjunction with FIGS. 5A, 5B, and 5C. In another example, AR motion 217 may indicate pixels to add indications of motion on the live images 238 as disclosed in conjunction with FIGS. 5A, 5B, and 5C. The generate user images module 108 adds UI items 234 to the live images 134, in accordance with some embodiments.

The generate user images module 108 processes the live images 134 based on one of more the following: visible area 206, zoom level 208, playback speed value 210, tutorial motion 216, tutorial effects 218, body part 222, and/or customization 226. In one example, the generate user images module 108 zooms to an identified body part 222. For example, a user 238 may be capturing a video of a full face with live image 134 and, as illustrated in FIG. 4, the generate user images module 108 zooms to the body part 222, such as the eye of the full face of the user 238.

In some embodiments, AR motion 217 and/or AR effects 219 indicates changes to make on a frame by frame basis of the live images 238. Generate user images module 108 may add items, such as UI items 234 to the AR user images 140.

Some example items that can be added include capture 432, 832, play bar 422, playback speed bar 414, step marks 426, current play 424, back 428, full screen 1216, send 1212, added effects 1306, added effects 1506, and the like. In some embodiments generate user images module 108 generates screens before the user 238 has entered the AR tutorial 143, such as screens 800, 900, 1000. Generate user images module 108 is configured to generate AR user images 140 as disclosed herein. Tutorial effects 218, tutorial motion 216, visible area 206, zoom level 208, playback speed value 210, pause 220, body part 222, beauty product 224, and/or customization 226 may have start times 212 and end times 214 that indicate a time within the AR tutorial video 228 when the parameter should be applied by generate user images module 108. The functionality performed by generate user images module 108 and/or generate tutorial images module 104 is termed processing the images, in accordance with some embodiments.

Respond to commands module 110 is configured to respond to commands 112 from the mobile device 146 and/or user 238 via the mobile device 146. Commands 112 include pause, play, forward 1604 and back 1602 of FIG. 16, changing a playback speed value with a playback speed bar 414 of FIG. 4, selecting a capture 432, selecting a beauty product 224A, 224B to get additional information, adjusting a zoom level, and so forth. Respond to commands module 110 is configured to respond to commands 112 as disclosed herein. Commands 112 may be indicated by the user 238 in different ways, such as by speech, finger motion on the screen 132, motion of user 238 in the live images 134, such as opening a mouth, making an OK sign, and so forth. In one example, a touch of finger 810 will pause the AR tutorial 143 and another touch of the finger 810 will play the AR tutorial 143. In another example, moving a thumb and finger 810 will adjust a zoom level 208.

The synchronize effects and motion module 106 synchronizes AR tutorial images 138 with AR user images 140. For example, as illustrated in FIGS. 5A, 5B, and 5C (and discussed herein) synchronize effects and motion module 106 synchronizes the displaying of tutorial effects 218A, 218B, 218C with AR effects 219A, 219B, 219C, respectively, and tutorial motions 216A, 216B, 216C with AR motions 217A, 217B, 217C, respectively. The synchronize effects and motion module 106 may be given live images 134 with AR motion 217 and tutorial effects 219 added by the generate user images module 108 and given AR tutorial images 138 from the generate tutorial images module 104 and synchronize the playing of the AR tutorial images 138 with the playing of the AR user images 140. In some embodiments, generate user images module 108 synchronizes AR user images 140 with AR tutorial images 138.

Referring to FIG. 2, AR tutorial data 202 is the data associated with AR tutorial 143. Step N 204 indicates data for a step of the AR tutorial data 202. Step N 204 indicates a step associated with parameters, such as the parameters disclosed in conjunction with FIGS. 2 and 3. Each step, such as steps 1608A, 1608B, and 1608C of FIG. 16 has step N data 204 associated with the step 1608A, 1608B, and 1608C. Visible area 206 is the portion of the AR tutorial video 228, live images 134, or user video 230 to be displayed on the screen 132. Zoom level 208 indicates a zoom level of the AR tutorial video 228, live images 134, or user video 230 to be displayed on the screen 132. Playback speed value 210 indicates a playback speed, such as a playback speed value 210, of the AR tutorial video 228 or user video 230. Start time 212 and end time 214 indicate a start time and an end time for parameters of step N 204. There may be multiple values for parameters for step N 204, such as two different zoom levels 208 with each having a start time 212 and end time 214. Parameters may have multiple start times 212 and end times 214 within step N 1904 indicating different values for the parameter, such as zoom level 208, visible area 206, and so forth. In some embodiments, start time 212 indicates a start time within the tutorial video 228 and/or user video 230 when an adjustment applies to the tutorial video 228 and/or user video 230. In some embodiments, adjustments, such as zoom level 208, is reset with the start of a new step.

Tutorial motion 216 is data that indicates motion of the application of a beauty product 224 as disclosed herein. AR motion 217 is data that indicates motion to be applied to the live images 134 and/or user video 230 as disclosed herein. Tutorial effects 218 is data that indicates changes to the AR tutorial video 228 from the application of a beauty product 224 to the body part 222 of the presenter 236 as disclosed herein. AR effects 219 is data that indicates changes to make to the user video 230 and/or live images 134 of the user 238 to simulate the tutorial effects 218 on the body part 222 of the user 238 in the user video 230 or live images 134 as disclosed herein.

Pause 220 is a time when the playing of the AR tutorial video 228 is to be paused. Pause 220 may further indicate how the AR tutorial video 228 is to return to playing or recording, such as by a set amount of time for a pause or an indication by the user 238 such as a tap of a finger to continue. Body part 222 is an indication of a body part of the presenter 236 and/or user 238 to which the beauty product 224 is applied. Customization 226 is customizations of step N 204 by the user 238, such as a change in playback speed value 210 by the user 238 or a change in the color 316 or brush width 318 of a beauty product data 302. Beauty product 224 corresponds to a beauty product with associated beauty product data 302 as disclosed herein.

AR tutorial video 228 is the video of the presenter 236 for step N 204 of the AR tutorial data 202. User video 230 is video of the user 238 taking or playing the AR tutorial 143 of AR tutorial data 202. User video 230 may be recorded for sending or storing by the user 238. Tutorial information 232 is information that is associated with the AR tutorial data 202, such as capture 832, screens 900 and 1000, preview of AR tutorial 1102, shows associated with the AR tutorial data 202, added effects 1224 and 1506, and so forth.

Figure 17:
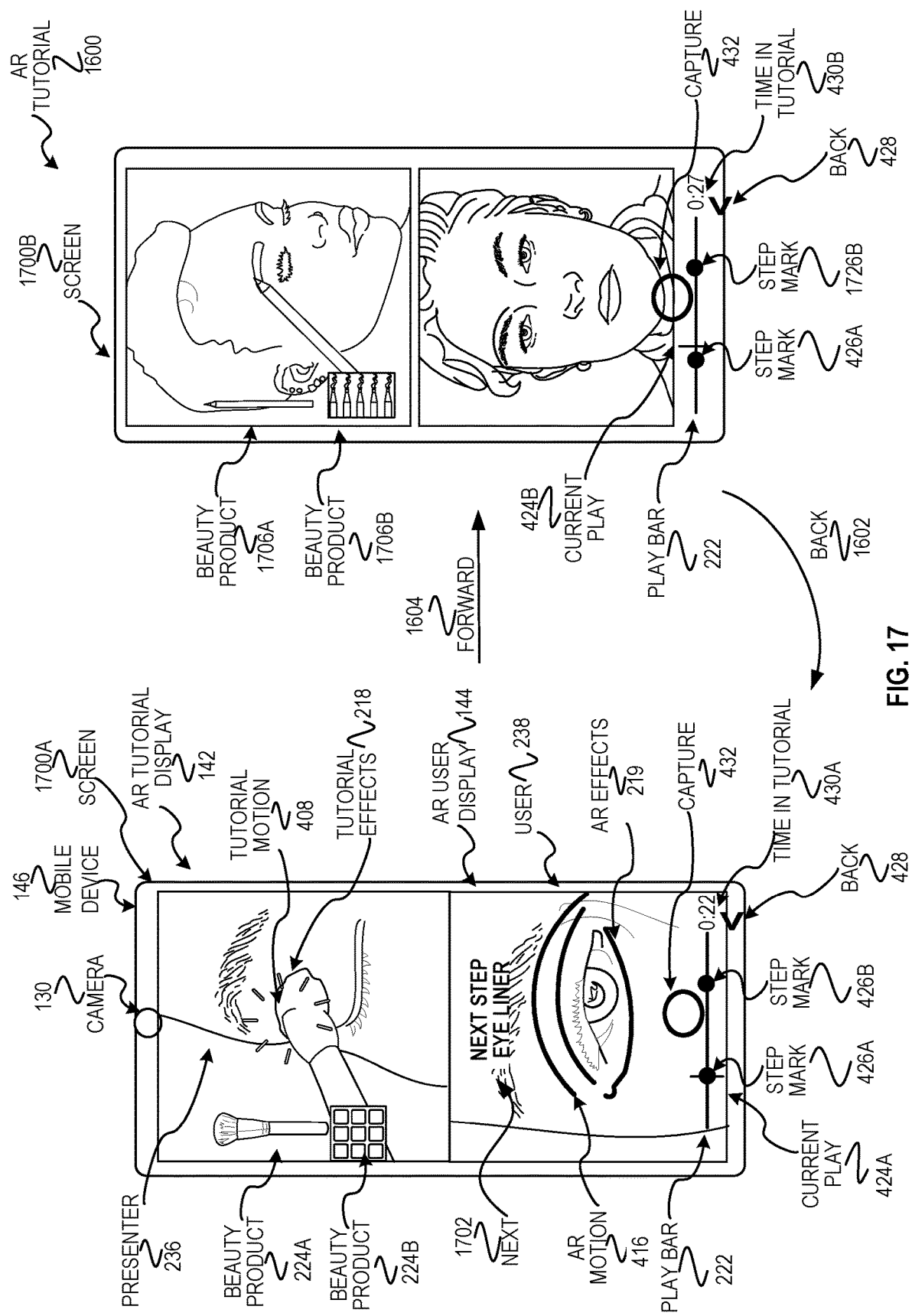
FIG. 17 illustrates moving to a next step, in accordance with some embodiments.

UI items 234 are UI items that may be used by AR tutorial 143. An example UI item is a label "Next Step Eye Liner" as a label for next 1702 as illustrated in FIG. 17. Presenter 236 corresponds to the presenter of the AR tutorial data 202. Presenter 236 may include information such as a presenter name, a website associated with the presenter, images of the presenter, and so forth. User 238 corresponds to the user of the AR tutorial data 202. User 238 may include information such as a username, a website associated with the user, images of the user, and so forth.

Options 240 may be options for the AR tutorial data 202, such as whether the user 238 may change any parameters of the AR tutorial data 202 such as a playback speed value 210. Statistics 242 may be statistics that are gathered about AR tutorial data 202. Some example statistics include how many users 238 select the capture 832 (FIG. 8) compared with how many users 238 view the capture 832; what percentage of users 238 complete the AR tutorial data 202; at which steps, do users 238 who do not complete the AR tutorial data 202 leave the tutorial; how often does a user 238 send, post, and/or save captured images; how many users 238 return to use the AR tutorial 143 after leaving the AR tutorial 143; and/or other statistics.

Referring to FIG. 3, beauty product data 302 is the data associated with a beauty product 224. Beauty product information 304 indicates information regarding the beauty product data 302, such as a name of the beauty product, a website related to the beauty produce, a price of the beauty product, and so forth. In some embodiments, beauty product information 304 includes information regarding effects that may be expected to occur to a body part 308 in the application of the beauty product 224. For example, the effects may indicate that a body part with a particular skin tone may expect a color change as indicated.

Purchase page 306 is one or more websites or pages associated with the beauty product 224. Body part 308 indicates a portion of a body of a person that is associated with the beauty product 224. Example body parts include an eye lid, an eye, a nose, lips, and so forth. In some embodiments, body part 302 is retrieved from a database of beauty products where the body part 308 is associated with the beauty product 224. For example, one or more of the data disclosed herein may be retrieved from beauty products 302 of FIG. 3.

Ingredient 310 is one or more ingredients of the beauty product 224. Ingredient percentage 312 indicates a percentage of an ingredient 310. Variations 414 indicates variations of the beauty product 224. Example variations 314 include color 316 and brush width 318. Variations 314 may include a selection menu 320 that assists a user 238 in selecting variations 314 of the beauty product data 302. Average rating 322 indicates average of ratings 324 of the beauty product 224. Ratings 324 are ratings of the beauty product 224 by users 238, presenters 236, and/or other people. The ratings 324 may be displayed from websites. Images of the beauty product 326 are images that may be used for display purposes to the user 238, such as beauty product 224A and 224B of FIG. 4. Competing products 328 are competing products that may be displayed to users 238 to switch the beauty product 224 or compare the beauty product 224 with competing products 328. Product codes 330 may be codes and/or other information to assist AR tutorial module 102 in identifying a beauty product 224 from live images 134 of the beauty product.

In some embodiments, AR tutorial module 102 is configured to display information related to the beauty product 224 in response to a selection of the beauty product 224 within the AR tutorial 143. For example, AR tutorial module 102 displays screen 1500 with information related to beauty product 224B in response to a selection of beauty product 224B by user 238.

FIG. 4 illustrates the operation 400 of an AR tutorial 143, in accordance with some embodiments. The camera 130, screen 132, AR tutorial display 142, AR tutorial 143, AR user display 144, and mobile device 146 are the same or similar as the elements with like numbers of FIG. 1. Playback speed value 210, tutorial motion 216, AR motion 217, tutorial effects 218, AR effects 219, body part 222A, 222B, beauty product 224A, 224B, and, user 238 are the same or similar as the elements with like numbers of FIG. 2. In some embodiments the AR user display 144 is a live image of a user 238 viewing or taking the AR tutorial 143.

Presenter 236 comprises an image of the presenter of the AR tutorial 143. For example, the presenter 236 in FIG. 4 is an image of a person that is presenting the AR tutorial 143 on how to apply make-up. Body parts 224A, 224B are the same or similar as body part 222. Beauty products 224A and 224B are each an image of beauty product 326 as disclosed in conjunction with FIG. 3. Beauty products 224A and 224B have associated beauty product data 302. Beauty product 224A and 224B each correspond to a beauty product 224 of AR tutorial data 202. In some embodiments, a different UI item 234 is used to indicate the beauty products 224A and 224B. For example, the beauty products 224 may be displayed in the AR user display 144. In another example, the beauty products 224 may not be displayed. In some embodiments, beauty products 224 may be displayed in response to a scroll left, scroll right, scroll up, and/or scroll down indication by the user 238. In some embodiments, beauty products 224 may include an animated display. In some embodiments, beauty products 224 may include an advertisement that plays within screen 132.

Playback speed value 210 indicates a value of the playback speed. The playback speed in FIG. 4 is illustrated as 1×, which represents 1 times a normal playback speed. Playback speed bar 414 indicates a playback speed of the AR tutorial 143. In some embodiments, a user 238 may interact with the playback speed bar 414 to change the playback speed value 210. In some embodiments, the playback speed value 210 and/or playback speed bar 414 are not displayed. In some embodiments, a different user interface element is used to indicate the playback speed value 210 and/or the playback speed bar 414.

AR motion 216 is the motion extracted from the tutorial motion 408 of the presenter 236, such as via motion extraction module 12 as disclosed in conjunction with FIG. 1. Determine motion module 122 extracts the motion 216 of FIG. 2, in accordance with some embodiments. AR motion 216 is the same or similar as motion 216 of FIG. 2, in accordance with some embodiments.

User 238 is the person using the mobile device 146 to view, play, or take the AR tutorial 143. In some embodiments, an image of the user 238 is displayed in the AR user display 144. In some embodiments, the user 238 indicates the image of a user in the AR user display 144. In some embodiments, the user 238 is a person who is the user of the mobile device 146 and viewing, playing, or taking the AR tutorial 143. In some portions of the disclosure, the user 238 is referred to as a person here, which can include any gender. In some portions of this disclosure, the user 238 is referred to as a woman; however, the user 238 may be a person of any gender.

AR effects 219 are determined from the tutorial effects 218 that are extracted from AR tutorial 143. For example, as disclosed in conjunction with FIG. 1, determine effects module 128 extracts tutorial effects 218 of FIG. 2 from AR tutorial video 228. In some embodiments, AR effects 219 are determined by the determine effects module 128. In some embodiments, AR effects 219 may be displayed differently. For example, AR effects 219 may be displayed separately from the user 238. In some embodiments, AR effects 219 may be adjusted to either reduce or intensify tutorial effects 218 on the user 238. For example, an intensity bar may be displayed on screen 132 where the user 238 may adjust AR effects 219 to either reduce or intensity the application of the tutorial effects 218 as the AR effects 219 on the user 238.

Play bar 422 is a bar indicating information regarding the playing of the AR tutorial 143. Current play 424 indicates the current position of play within the AR tutorial 143. Step marks 426A, 426B indicate the end and start of steps. Time in tutorial 430 indicates the current time of the current play 424. In some embodiments, time in tutorial 430 is a time left in the AR tutorial 143. In some embodiments, time in tutorial 430 indicates the time from the start of the AR tutorial 143. The information regarding playing of the AR tutorial 143 illustrated in FIG. 4 is just one example. In example embodiments, the information for playing the AR tutorial 143 may be presented differently, one or more pieces of information may not be presented, or additional information may be presented that is not illustrated in the example in FIG. 4.

Back 428 is a user interface element, such as an icon, that will take the AR tutorial 143 back one or more steps. For example, selecting back 428 may take the user 238 out of the AR tutorial 143. Back 428 is a command 112 as disclosed in conjunction with FIG. 1.

Capture 432 is a user interface element, such as an icon, that when selected captures an image of the AR user display 144 and/or AR tutorial display 142. In some embodiments, a long press on capture 432 captures a video of the AR user display 144 and/or AR tutorial display 142. Capture 432 is a command 112 as disclosed in conjunction with FIG. 1. The functionality of capture 432 may be invoked in different ways as disclosed in conjunction with FIG. 1. The functionality of back 428 and/or capture 432 may depend on the context with which they are selected. Synchronized 434 indicates that tutorial motion 216 and tutorial effects 218 are synchronized with AR motion 217 and AR effects 219, respectively, in accordance with some embodiments. For example, the synchronize effects and motion module 106, the generate user images module 108, and/or the generate tutorial images module 104 may perform the functionality of synchronized 434 as disclosed herein.

The AR user display 144 is generated by the generate user images module 108. The generate user images module 108 may perform image adjustments from the live images 134 and/or user video 230. For example, the generate user images module 108 may take an image of the user 238 captured via the camera 130 and locate a body part 222 associated with step N 202 of the AR tutorial 143. For example, as illustrated in FIG. 5 a right eye. Generate user images module 108 may then zoom in on the image captured of the user 238 so that the body part 222 is proportional in size to the body part 222 of the presenter 236. The user 238 may be moving so that generate user images module 108 may continually adjust the display of the image of the user 238 on the AR user display 144. In some embodiments, a creator of the AR tutorial 143 may determine a visible area 206 (FIG. 2), zoom level 208, and/or playback speed value 210 for the AR tutorial 143 that can be used by the generate user images module 108 to perform image adjustments to the image of the user 238 for display in the AR user display 144.

In some embodiments, AR tutorial 143 will loop for each step of the AR tutorial 143 until the user 238 selects to move to a next step. This is described in further detail in conjunction with FIGS. 15 and 16. In some embodiments, AR tutorial 143 progresses to a next step, such as past the step marks 426A and 426B, without looping or pausing. In some embodiments, AR tutorial 143 pauses at the end of a step such as step 1608A, 1608B, or 1608C of FIG. 16. In some embodiments, AR tutorial 143 pauses at the end of a step until user 238 indicates to move to the next step. For example, the user can indicate a command to move to the next step by a selection of a user interface element, a movement of the user 238 within the AR user display 144, a sound, and so forth. In some embodiments, the user 238 can perform a customization 226 of FIG. 2, such as changing a color 316 and/or brush width 318.

In some embodiments, the AR tutorial module 102 presents a selection menu 320 to the user 238, and, in response to a selection of a customization 226 by the user 238, updates AR effects 219 and/or AR motion 217, and displays the user 238 in the AR user display 144 based on the updated AR effects 219 and/or AR motion 217. Screen 1500 of FIG.

15 illustrates an example where a different current color 1216 may be selected by the user 238.

In some embodiments, the user 238 can switch between a full-screen AR user display 144 and a half-screen or partial screen 132 view of the user 238 with the AR effects 420 and/or AR motion 216. In some embodiments, the user 238 is presented with an option to turn off AR effects 420. The user 238 may then apply a beauty product data 302 to themselves and use the AR motion 216 to assist themselves in applying the beauty product data 302, in accordance with some embodiments.

FIGS. 5A, 5B, and 5C illustrate the operation 500A, 500B, 500C of an AR tutorial 143, in accordance with some embodiments. The camera 130, screen 132, AR tutorial display 142, AR tutorial 143, AR user display 144, and mobile device 146 are the same or similar as the elements with like numbers of FIG. 1. Tutorial motion 216A, 216B, 216C, tutorial effects 218A, 218B, 218C, AR motion 217A, 217B, 217C, AR effects 219A, 219B, 219C, presenter 236, beauty products 224, playback speed value 210, and user 238 are the same or similar as the elements with like numbers of FIG. 2. Playback speed bar 414, play bar 422, current play 424A, 424B, 424C, step marks 426, back 428, time in tutorial 430A, 430B, 430C, capture 432, synchronized 434 are the same or similar as the elements with like numbers of FIG. 4.

FIGS. 5A, 5B, and 5C illustrate that tutorial motion 216A, 216B, 216C and tutorial effects 218A, 218B, 218C are synchronized 434 with AR motion 217A, 217B, 217C, and AR effects 219A, 219B, 219C, respectively. FIG. 5A illustrates a time in tutorial of "0:12" or 12 seconds. FIG. 5B illustrates a time in tutorial of "0:17" or 17 seconds. FIG. 5C illustrates a time in tutorial of "0:22" or 22 seconds. The AR motion 217A, 217B, and 217C simulate the motion of tutorial motion 216A, 216B, 216C, respectively. The AR effects 219A, 219B, 219C simulate the tutorial effects 218A, 218B, 218C, respectively. Synchronizing the tutorial motion 216 and tutorial effects 218 with the AR motion 217 and AR effects 219, respectively, enables the user 238 to see how the application of the beauty products 224 would look on her in a similar way as the application of the beauty products 224 are applied to the presenter 236.

Figure 6:
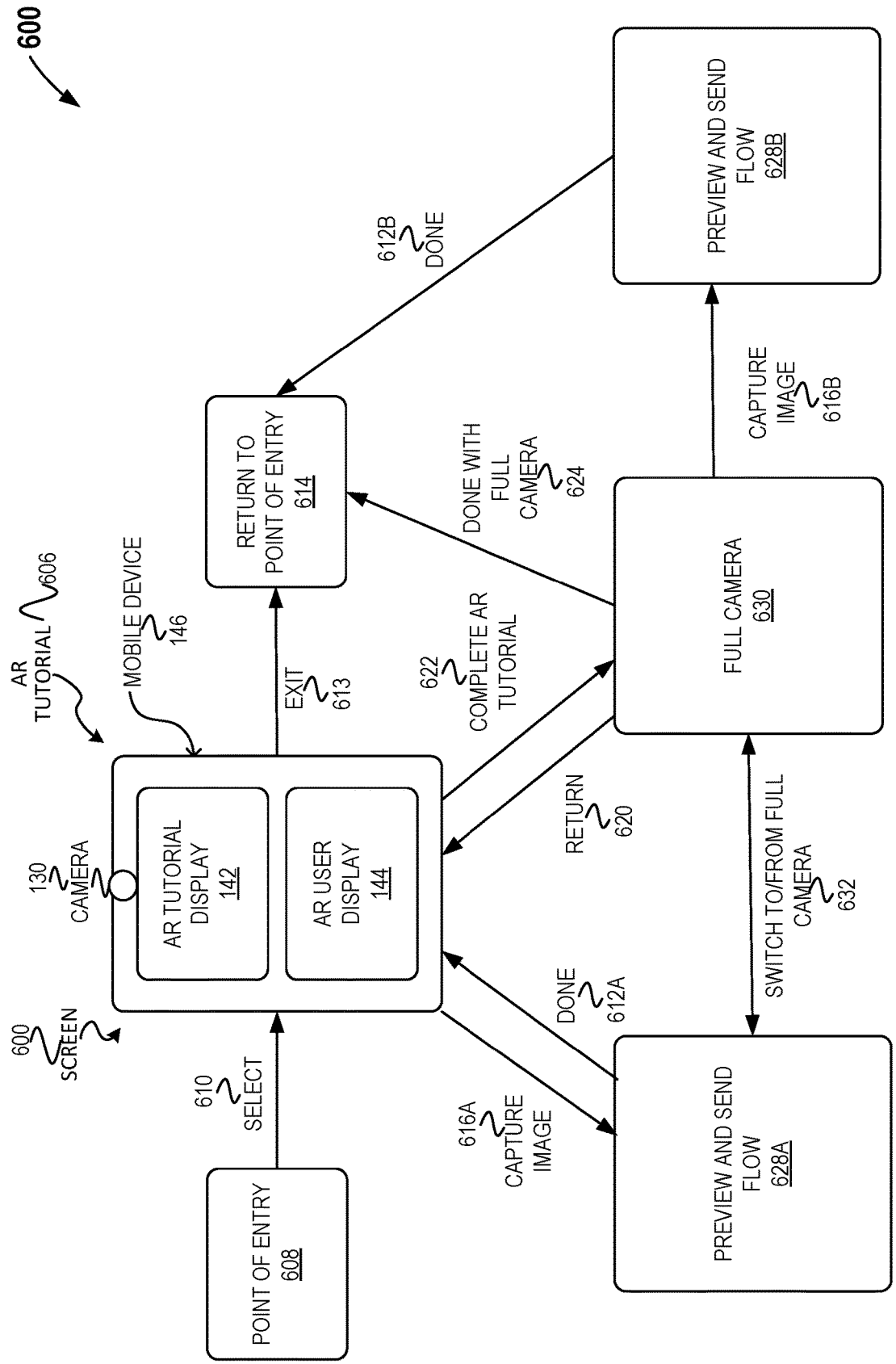
FIG. 6 illustrates a flow diagram for using an AR tutorial, in accordance with some embodiments.
Figure 7:
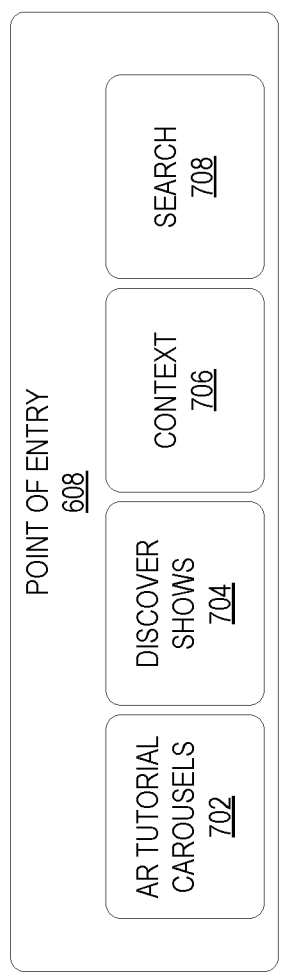
FIG. 7 illustrates a point of entry, in accordance with some embodiments.

FIGS. 6 and 7 are disclosed in conjunction with one another. FIG. 6 illustrates a flow diagram 600 for using an AR tutorial 602, in accordance with some embodiments. FIG. 7 illustrates a point of entry 608, in accordance with some embodiments. Screen 600 is the same or similar as screen 132 of FIG. 1. Camera 130, AR Tutorial display 142, AR user display 144, mobile device 146 are the same or similar as the elements with like numbers of FIG. 1. AR tutorial 606 is the same or similar as AR tutorial 143 of FIG. 1.

Figure 8:
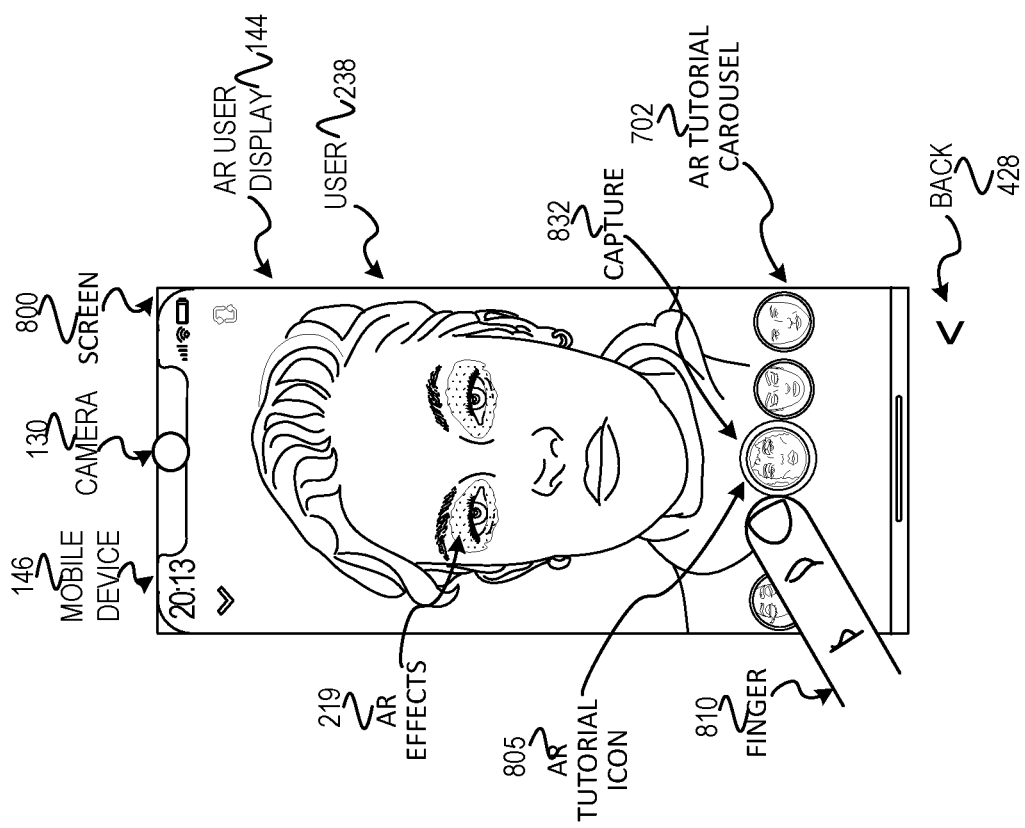
FIG. 8 illustrates an AR tutorial carousel, in accordance with some embodiments.

A user 238 (not illustrated) of AR tutorial 606 uses a mobile device 146 with a camera 130. The user 238 selects 610 a command 112 to enter the AR tutorial 606 from a point of entry 608. For example, as illustrated in FIG. 8, a user 238 selects 610 command 112 capture 832 to enter AR tutorial 606 where the AR tutorial 606 is being highlighted or previewed in screen 800. As illustrated in FIG. 7, a user may enter the AR tutorial 606 via a AR tutorial carousel 702, discover show 704, context 706, or search 708. Context 706 indicates that AR tutorials 606 (FIG. 6) may be offered to the user 238 within the context of another task the user 238 is performing. For example, the user may be watching a video or receive an image and be offered a link to AR tutorial 606 that will teach the user how to apply makeup to look like a person in the video or image.

Figure 9:
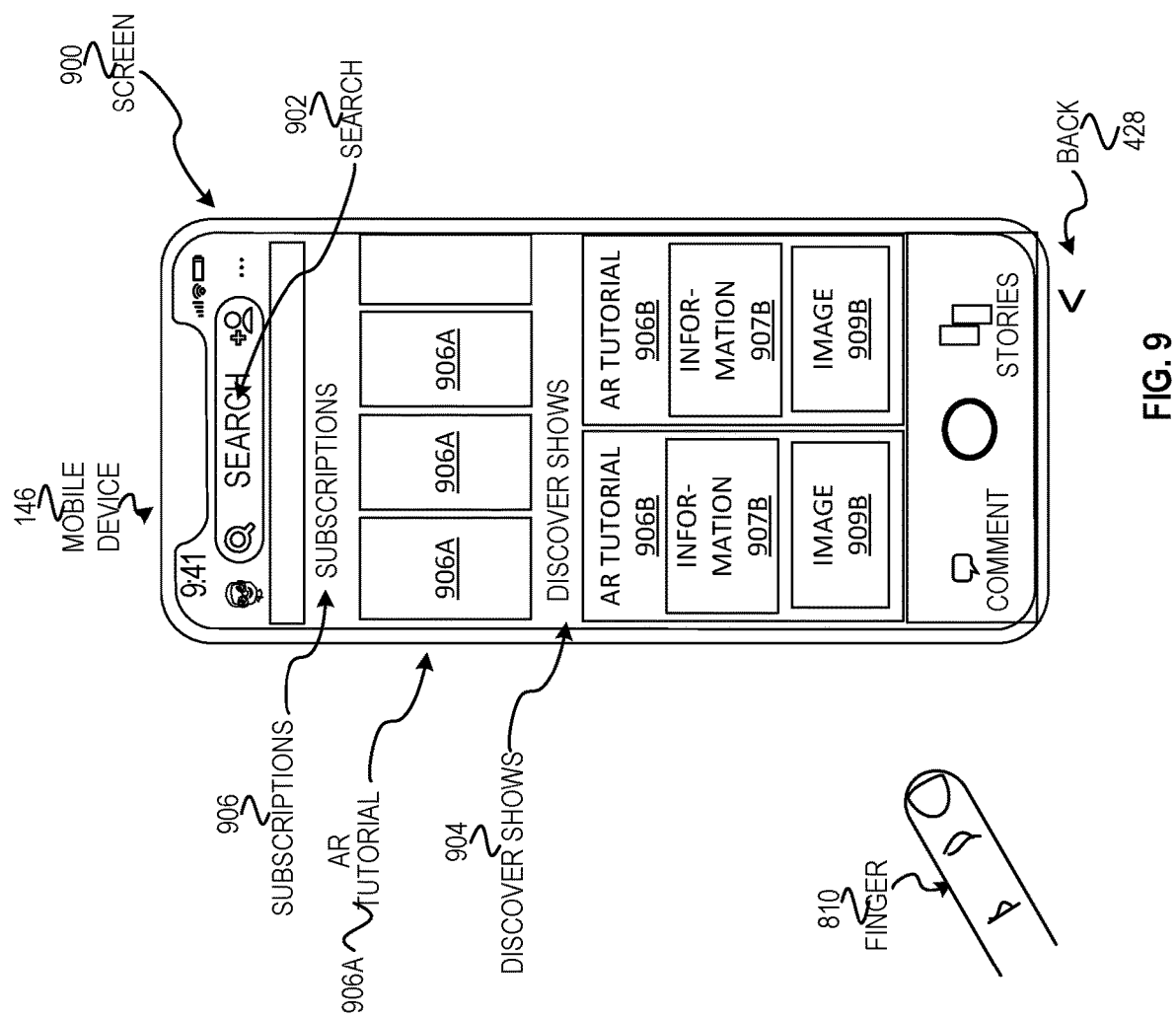
FIG. 9 illustrates points of entry into AR tutorial, in accordance with some embodiments.
Figure 10:
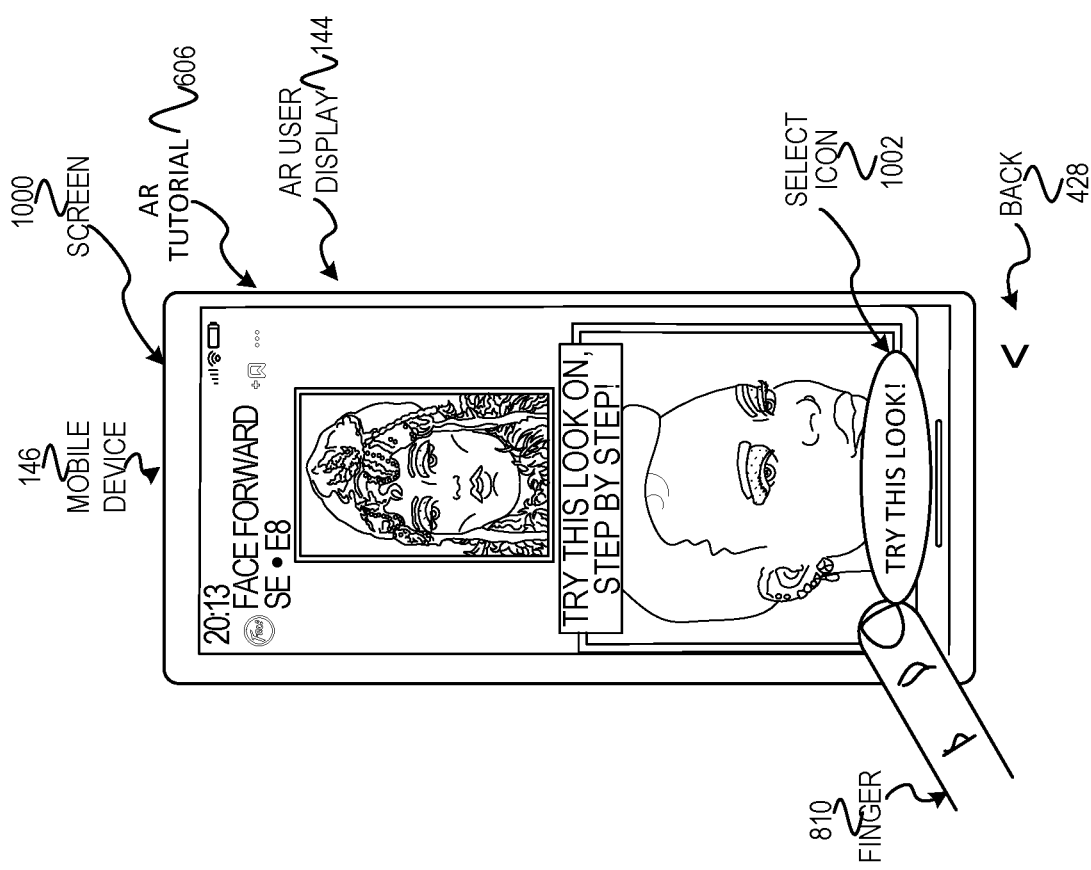
FIG. 10 illustrates a point of entry, in accordance with some embodiments.

FIGS. 8, 9, and 10 illustrate points of entry, in accordance with some embodiments. FIG. 8 illustrates an AR tutorial carousel 702, in accordance with some embodiments. Screen 800 is the same or similar as screen 132 of FIG. 1. Camera 130, AR user display 144, and mobile device 146 are the same or similar as the elements with like numbers of FIG. 1. User 238 is the same or similar as user 238 of FIG. 2. The AR effects 420, and back 428 are the same or similar as the elements with like numbers of FIG. 4. AR tutorial 606 is the same or similar as AR tutorial 606 of FIG. 6. Finger 810 is a finger of the user 238.

Capture 832 indicates that the AR tutorial 606 highlighted by capture 832 is being previewed on the AR user display 144 with the user 238 having AR effects 420 from the AR tutorial 606 added to the user 238. The user 238 can preview AR tutorial 606 and determine whether to enter AR tutorial 606 by placing AR tutorial icon 805 under the capture 832 icon. AR tutorial data 202 of AR tutorial 606 may be termed a Lenses®, in accordance with some embodiments. If user 238 selects 610 (FIG. 6) capture 832, such as with finger 810, then the user 238 enters the AR tutorial 606 (FIG. 6) corresponding to the AR tutorial icon 805. For example, the user can view or take the AR tutorial 606 via screen 600 of FIG. 6. Selecting capture 832 is a command 112 of FIG. 1. The user 238 may preview other AR tutorials that are indicated as part of the AR tutorial carousel 702. For example, the user can swipe a finger 810 to move different AR tutorials icons 805 under capture 832. AR tutorial carousel 702 is a collection of items that can be put under capture 832 and then selected by the user 238. Select 610 of FIG. 6 may be performed in a different way. Other AR tutorial icons 805 may be moved under the capture 832 element in different ways. In some embodiments, a selection of back 428 would return the user 238 to a screen (not illustrated) before screen 800 of FIG. 8.

FIG. 9 illustrates points of entry 608 into AR tutorial, in accordance with some embodiments. Screen 900 is the same or similar as screen 132 of FIG. 1. Mobile device 146 is the same or similar as the elements with like numbers of FIG. 1. Back 428 is the same or similar as the element with like number of FIG. 4. Finger 810 is the same or similar as the element with like number of FIG. 8. AR tutorials 906A and 906B are the same or similar as AR tutorial 606 of FIG. 6. Discover shows 904 is the same or similar as discover shows 704 of FIG. 7. Search 902 is the same or similar as search 708 of FIG. 7.

A select 610 (FIG. 6) by user 238 (not illustrated), such as with finger 810, brings the user 238 into screen 600 of FIG. 6. The user 238 may select 610 an AR tutorial 906A, 906B by entering one or more search terms in search 902 and selecting an AR tutorial from search results (not illustrated). The user may select 610 (FIG. 6) an AR tutorial 906A from subscriptions 906. The user may select 610 AR tutorial 906B from discovery shows 904. AR tutorials 906A, 906B may be displayed with information 907B and/or image 909B. Information 907B and/or image 909B may include information from AR tutorial data 202 such as tutorial information 232, presenter 236, and so forth. In some embodiments, a selection of back 428 returns the user to a screen (not illustrated) before screen 900 of FIG. 9.

FIG. 10 illustrates a point of entry 608, in accordance with some embodiments. Screen 1000 is the same or similar as screen 132 of FIG. 1. AR user display 144 and mobile device 146 are the same or similar as the elements with like numbers of FIG. 1. Back 428 is the same or similar as the element with like number of FIG. 4. AR tutorial 606 is the same or similar as AR tutorial 606 of FIG. 6. Finger 810 is the same or similar as the finger 810 of FIG. 8. Select icon 1002 illustrates an icon that when selected by the user, brings the user to screen 600 of FIG. 6, in accordance with some embodiments. Screen 1000 illustrates a preview of AR tutorial 606, in accordance with some embodiments.

Figure 11:
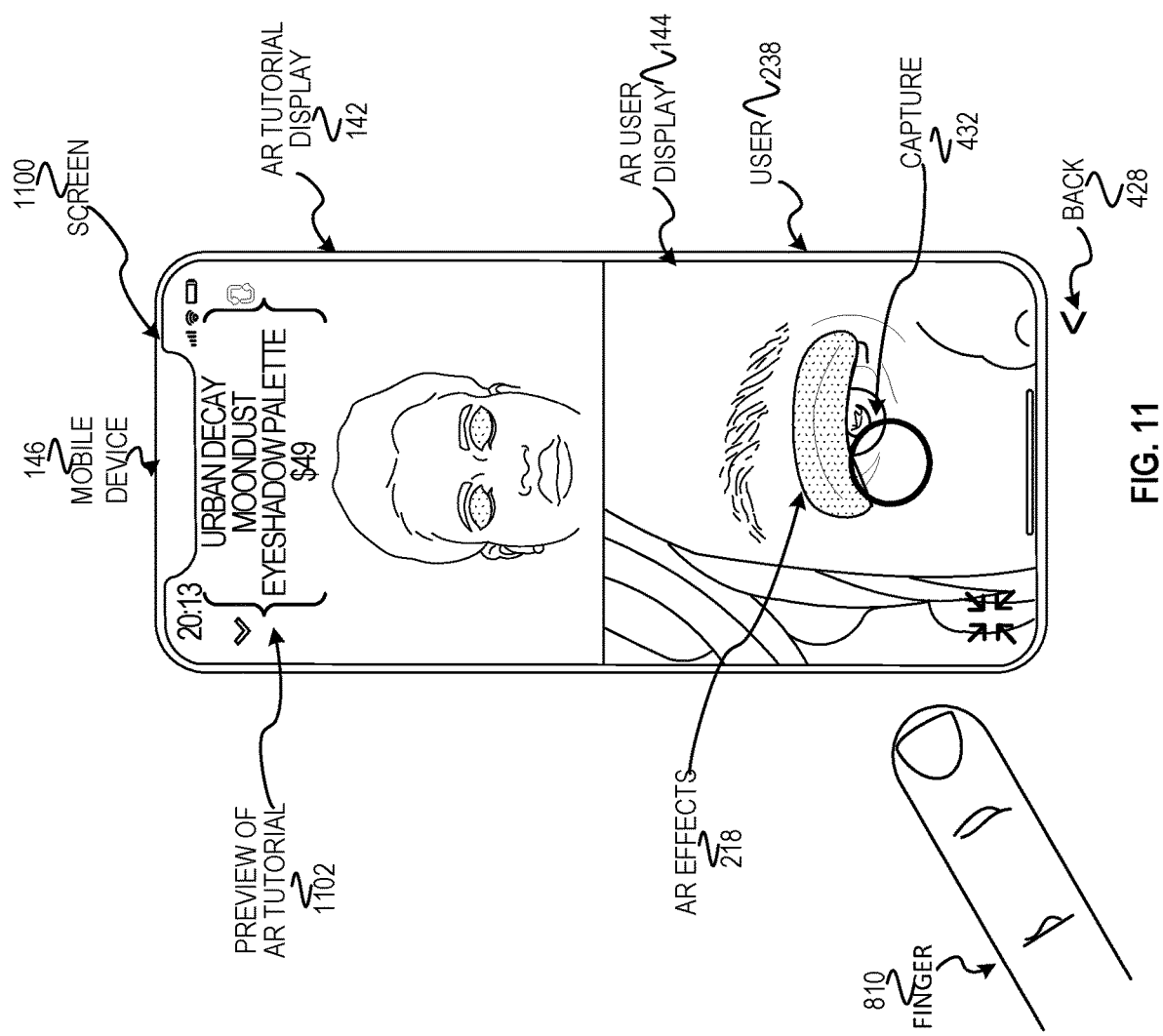
FIG. 11 illustrates a point of entry, in accordance with some embodiments.

FIG. 11 illustrates a point of entry, in accordance with some embodiments. Mobile device 146, AR tutorial display 142, and AR user display 144 are the same or similar as the elements with like numbers of FIG. 1. User 238 is the same or similar as user 238 of FIG. 2. AR effects 420, capture 432, back 428 are the same or similar as the elements with like numbers of FIG. 4. Finger 810 is the same or similar as the element with like number of FIG. 8.

Preview of AR tutorial 1102 may include educational information that educates the user 238 on how to use the AR tutorial 606 that is the subject of the preview of AR tutorial 1102, such as indications of how to step through AR tutorial 606. AR effects 420 are added to the user 238. User 238 may preview the results of AR tutorial that is the subject of AR tutorial display 142 with the AR effects 420 by viewing screen 1100.

A select 610 (FIG. 6) of capture 432, such as with finger 810, brings the user 238 to screen 600 of FIG. 6. In some embodiments, the user 238 is already in AR tutorial 606 of FIG. 6 and the preview of AR tutorial 1102 is a start screen for AR tutorial 606 to provide information to the user 238, such as educational information on how to use AR tutorial 606, types of make-up used, and so forth. In some embodiments, additional information may be displayed in screen 1100 such as information from AR tutorial data 202.

Figure 12:
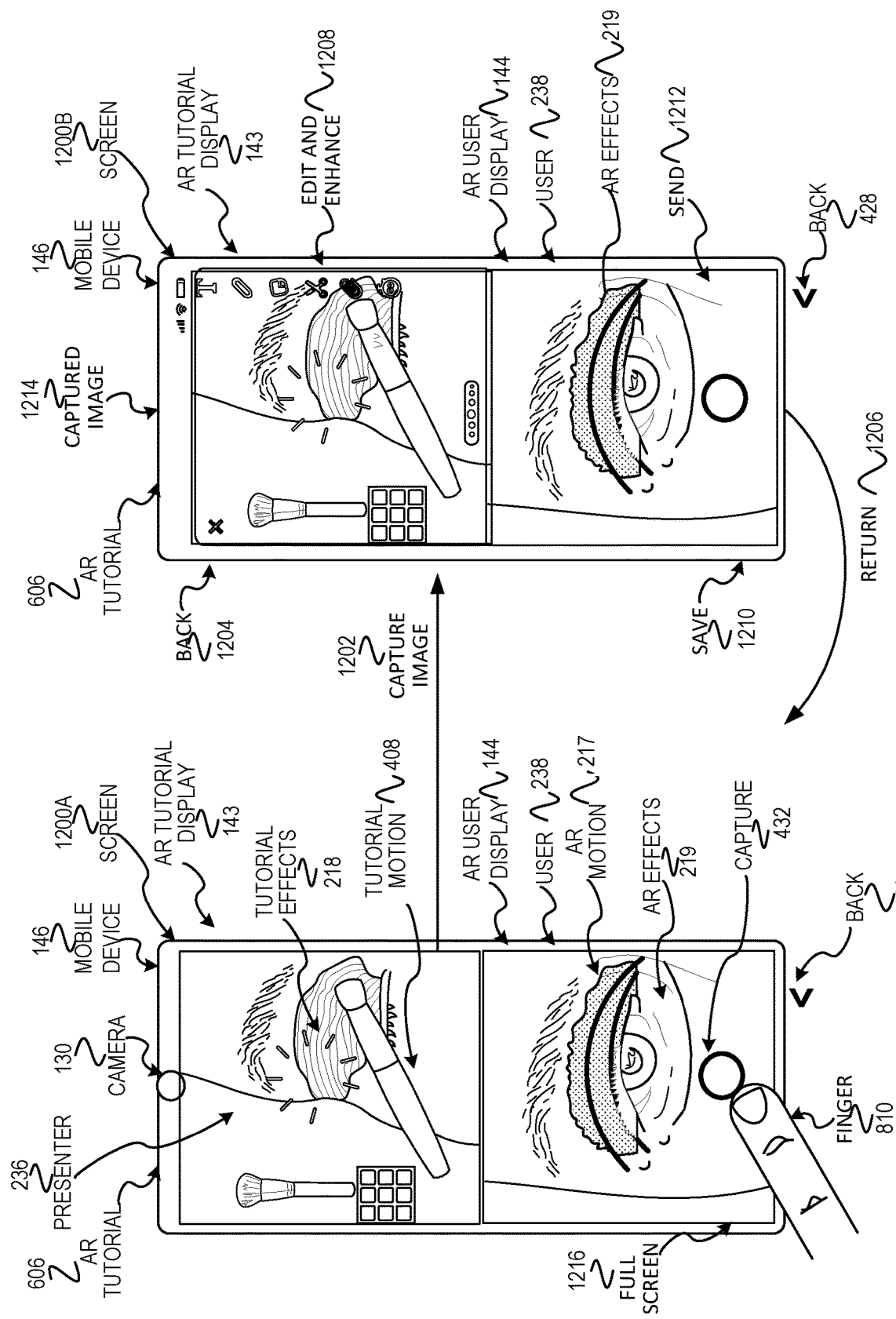
FIG. 12 illustrates capturing an image, in accordance with some embodiments.

Returning to FIG. 6, once a user selects 610 to enter the AR tutorial 606 from a point of entry 608 as disclosed in conjunction with FIGS. 7-11, the user's options include capture image 616A, completing the AR tutorial 622, or exit 613 the AR tutorial 606. The user selection of capture image 616A brings the user to screen 1200B or 1300. The user may be done 612A with preview and send flow 628A and return to screen 600 as disclosed in conjunction with FIGS. 12 and 13. The user may move from preview and send flow 628A to full camera 630 via switch to/from full camera 632. For example, as illustrated in FIG. 12, the user 238 may select full screen 1216 to enter screen 1300 of FIG. 13 via full screen 1302.

Figure 13:
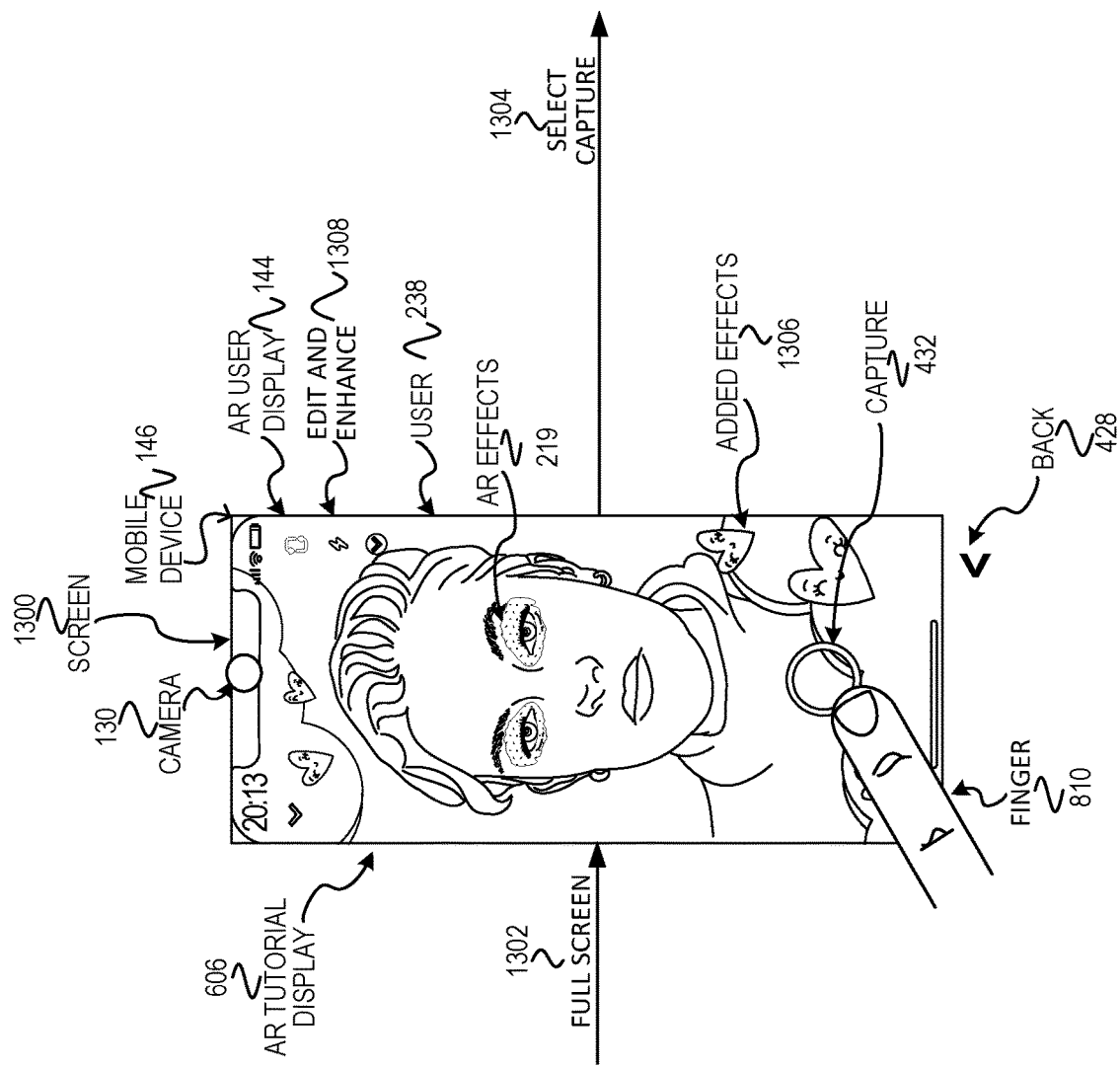
FIG. 13 illustrates capturing an image, in accordance with some embodiments.

In accordance with some embodiments, the user completing AR tutorial 606 brings the user to full camera 630. For example, as illustrated in FIG. 13, AR user display 144 is in a full screen mode. The user may return 620 to screen 600 as disclosed in conjunction with FIG. 13. For example, as illustrated in FIG. 13, the user 238 may select back 428.

The user may be done with full camera 624. For example, as illustrated in FIG. 13, user 238 may select back 428 from screen 1300 to be done with full camera 624 and be brought to return to point of entry 614. The user may switch to/from full camera 632 to go back to preview and send flow 628A. For example, as illustrated in FIG. 13, user 238 may select back 428 to be returned to screen 1200A of FIG. 12 when the user 238 entered 1300 via full screen 1302. The user may capture image 616B to be brought to preview and send flow 628B. For example, as illustrated in FIG. 13 user 238 may capture an image by selecting capture 432 to be brought to screen 1400 of FIG. 14. The user may be done 612B from preview and send flow 628B. For example, as disclosed in conjunction with FIG. 14, user 238 may return 1456 to return to point of entry 614.

The user may exit 613 from AR tutorial 606 to enter return to point of entry 614. For example, user 238 of FIG. 4 may select back 428 to return to a previous screen. Return to point of entry 614 returns the user to another screen that is not part of the AR tutorial 606 and may be the last screen the user was presented before entering the AR tutorial 606 such as screen 800 of FIG. 8.

FIG. 12 illustrates capturing an image, in accordance with some embodiments. Screen 1200A and screen 1200B are the same or similar as screen 132 of FIG. 1. Camera 130, AR tutorial display 142, AR user display 144, and mobile device 146 are the same or similar as the elements with like numbers of FIG. 1. Presenter 236 and user 238 are the same or similar as the elements with like numbers of FIG. 2. Tutorial motion 408, tutorial effects 410, AR motion 216, AR effects 420, back 428, capture 432 are the same or similar as the elements with like numbers of FIG. 4. AR tutorial 606 is the same or similar as AR tutorial 606 of FIG. 6. Finger 810 is the same or similar as finger 810 of FIG. 8.

The user 238 may select capture 432 with her finger 810 during AR tutorial display 606. When the user 238 selects capture 432, it invokes capture image 1202 command, which captures captured image 1214. Capture image 1202 is a command 112. The user 238 may edit and enhance 1208 the captured image 1214, save 1210 the captured image 1214, send 1212 the captured image 1214, or go back 1204, 428, in accordance with some embodiments. The AR effects 219 are included in the captured image 1214 and the AR motion 217 is not included in the captured image 1214, in accordance with some embodiments. In some embodiments, the AR motion 217 is included in the captured image 1214. In some embodiments, an option is provided to the user 238 to include the AR motion 217.

Return 1206 returns the user from screen 1200B to previous screen 1200A, in accordance with some embodiments. Screen 1200B may return 1206 to screen 1200A after the user 238 saves 1210 the captured image 1214, sends 1212 the captured image 1214, or selects go back 1204, 428, in accordance with some embodiments. In some embodiments, when the user 238 selects capture 432, such as with finger 810, AR user display 144 occupies the entire screen 1200B such as screen 1300 rather than half the screen 1200B. In some embodiments, selecting full screen 1216 brings the user 238 to screen 1300 of FIG. 13.

FIG. 13 illustrates capturing an image, in accordance with some embodiments. Screen 1300 is the same or similar as screen 132 of FIG. 1. Camera 130, screen 1300, mobile device 146, AR user display 144 are the same or similar as the elements with like numbers of FIG. 1. User 238, AR effects 420, back 428, return 428, capture 432 are the same or similar as the elements with like numbers of FIG. 4. AR tutorial 606 is the same or similar as AR tutorial 606 of FIG. 6. Finger 810 is the same or similar as finger 810 of FIG. 8.

Screen 1300 is a live image of the user 238 from camera 130. The user 238 enters screen 1300 by complete AR tutorial 622 of FIG. 6 or by selecting full screen 1216 of FIG. 12 to invoke full screen 1302 command, in accordance with some embodiments. Full screen 1302 is a command 112. The user 238 enters screen 1400 of FIG. 14 by selecting capture 432. For example, with her finger 810. Edit and enhance 1308 provides options for adding to the screen 1300 added effects 1306. The AR effects 420 are included in screen 1300. AR user display 144 is displayed on a full screen. Back 428 takes the user 238 to a previous screen such as screen 1200A of FIG. 12 or screen 132 of FIG. 4, in accordance with some embodiments.

Figure 14:
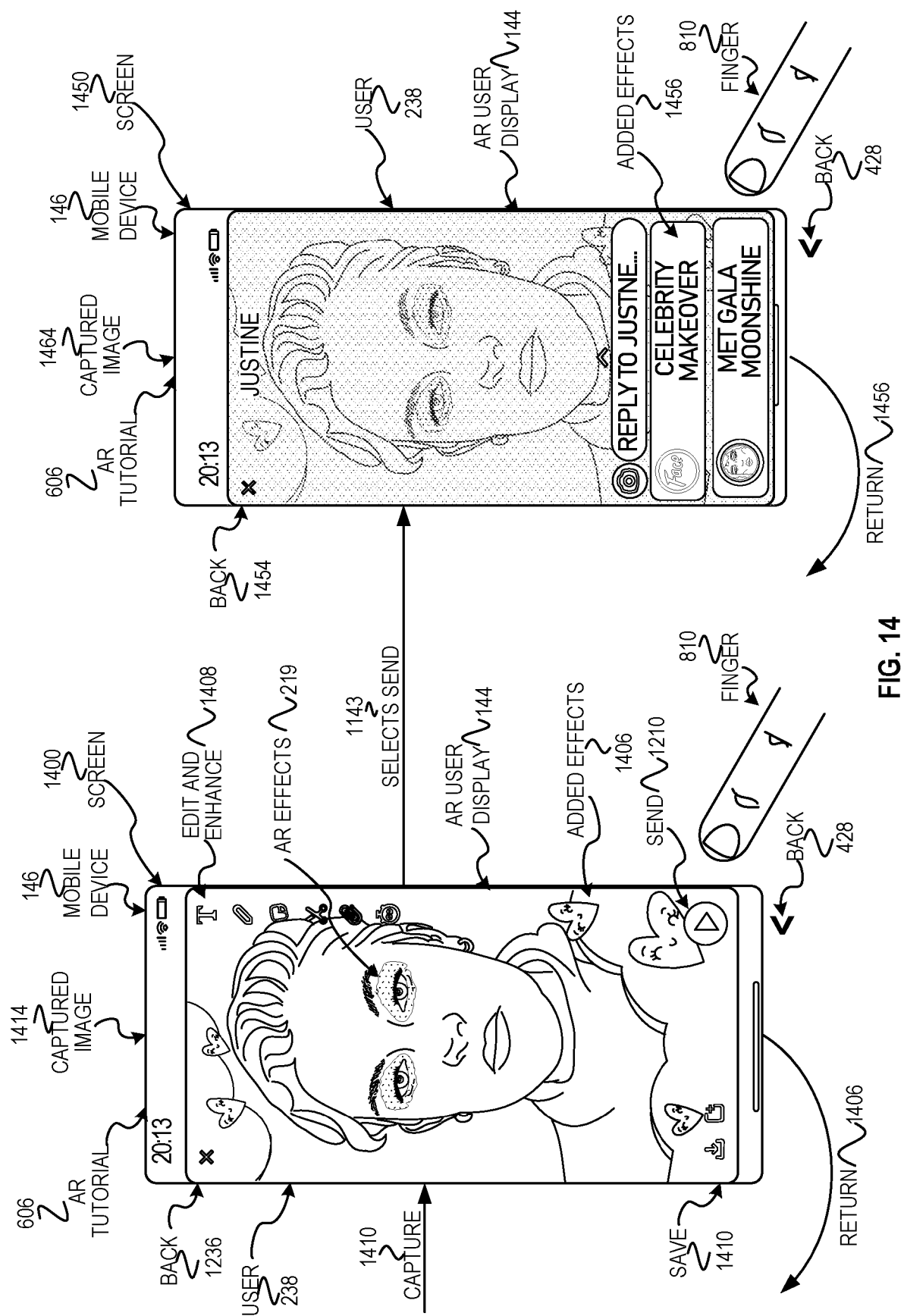
FIG. 14 illustrates captured images, in accordance with some embodiments.

FIG. 14 illustrates captured images 1414 and 1464, in accordance with some embodiments. Screens 1400, 1450 are the same or similar as screen 132 of FIG. 1. Camera 130, AR user display 144, and mobile device 146 are the same or similar as the elements with like numbers of FIG. 1. AR effects 219, back 428, and user 238 are the same or similar as the elements with like numbers of FIG. 4. AR tutorial 606 is the same or similar as AR tutorial 606 of FIG. 6. Finger 810 is the same or similar as finger 810 of FIG. 8.

The AR user display 144 is displayed as a full screen on screens 1400, 1450. The user 238 of FIG. 14 comes to screen 1400 after selecting a command to capture 1410 an image. For example, user 238 of FIG. 13 selects capture 432 to arrive at screen 1400. Capture 1410, selects send 1402, return 1224, and return 1456 are commands 112. The user 238 may send 1212 the captured image 1414. For example, user 238 may select send 1412, which sends the captured image 1414. AR tutorial 606 may invoke return 1406, 1456 after the captured image 1414 is sent. The user 238 may return 1406, 1456 to a previous screen such as screen 1300, by selecting back 1404,1454 or back 428. The user 238 may perform a selection with her finger 810. For example, user 238 may select send 1412 with a finger 810. The user 238 may save 1410 the captured image 1414. The user 238 may edit and enhance 1408 the captured image 1414 such as modify the image to add added effect 1224. Captured image 1414 includes AR effects 420.

The user 238 comes to screen 1450 after selecting a command to send an image of screen 1400. For example, the user 238 selects send 1212. AR tutorial 606 may modify the captured image 1464 to add added effects 1456 before sending the captured image 1464. The added effects 1456 identify the creator of the AR tutorial 606, identify shows associated with the AR tutorial 606, and/or provide other information from AR tutorial data 202. The user 238 may return 1456 either based on a timer or selection of a back 428, 1454. The added effects 1456 may be included in AR tutorial data 202 such as tutorial information 232 or presenter 236.

Figure 15:
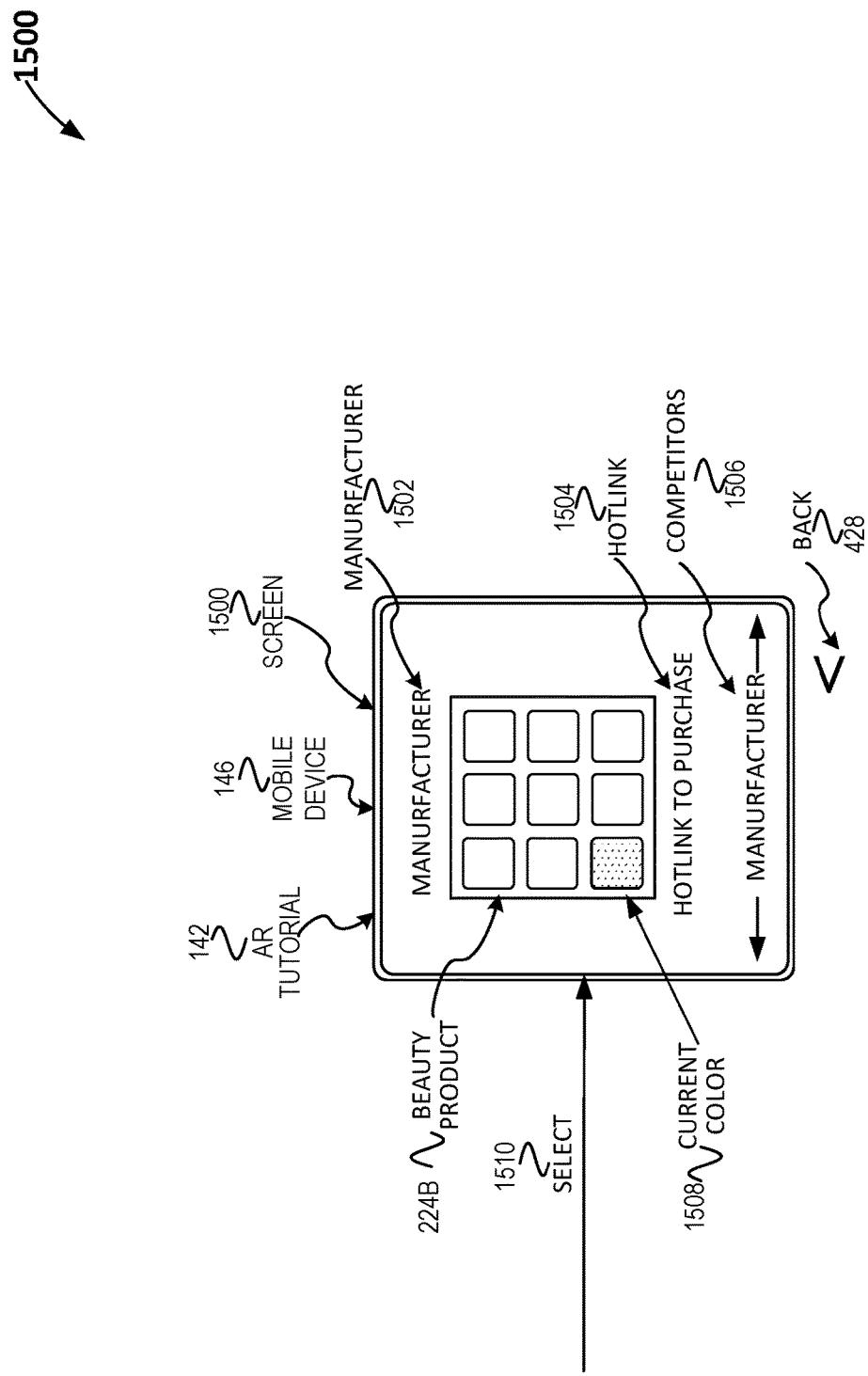
FIG. 15 illustrates information for a beauty product, in accordance with some embodiments.

FIG. 15 illustrates information 1500 for a beauty product, in accordance with some embodiments. Mobile device 146 and AR tutorial 142 are the same or similar as the elements with like numbers of FIG. 1. Screen 1500 is the same or similar as screen 132 of FIG. 1. Back 428 and beauty product 224B are the same or similar as elements with like numbers of FIG. 4.

A user may arrive at screen 1500 from select 1510. Select 1510 is a command 112. For example, referring to FIG. 4, a user 238 may select beauty product 224B. Back 428 will bring the user back to the screen where the user came from. For example, back to screen 132 of FIG. 4. Manufacturer 1502 is a manufacturer of the beauty product 224B. Manufacturer may be included in beauty product data 302 of FIG. 3. Hotlink 1504 is one or more hotlinks to purchase or provide additional information regarding beauty product 224B. Hotlink is included in purchase page 306 of FIG. 3 and/or beauty product information 304. Current color 1508 indicates a current selection of a variation of the beauty product 224B, such as color 316 of FIG. 3. Competitors 1506 provides an indication of competitors of the beauty product 224B. Competitors may be included in competing products 328. A selection of competitors 1506 brings the user to a screen (not illustrated) with information regarding the competitor. Different information may be displayed than is illustrated such as information from AR tutorial data 202 of FIG. 2 and/or beauty product data 302 of FIG. 3.

Figure 16:
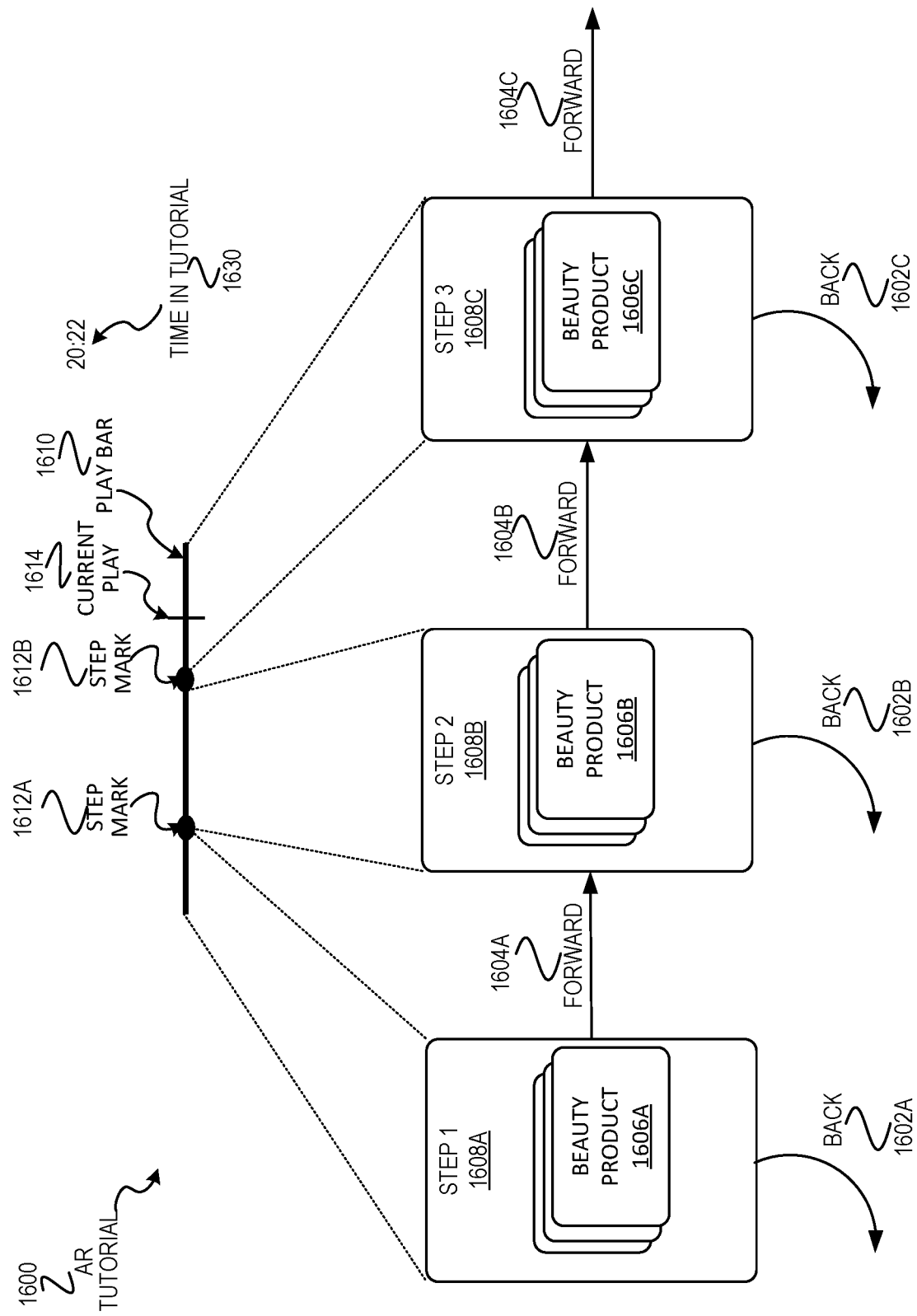
FIG. 16 illustrates steps of an AR tutorial, in accordance with some embodiments.

FIG. 16 illustrates steps of an AR tutorial 1600, in accordance with some embodiments. Step marks 1612 are the same or similar as step marks 426 of FIG. 4. Current play 1614 is the same or similar as current play 424. Play bar 1610 is the same or similar as play bar 422. Beauty products 1606 are the same or similar as beauty product data 302 as disclosed in conjunction with FIG. 3. Steps 1608 are the same or similar as step N 204 of FIG. 2. AR tutorial 1600 is the same or similar as AR tutorial 143.

The play bar 1616 indicates a duration of time of the AR tutorial 1600. Step 1 1608A is from the beginning of the play bar 1610 to step mark 1612A. Step 2 1608B is from step mark 1612A to step mark 1612B. Step 3 1608C is from step mark 1612B to end of play bar 1610. Steps 1608 may include different parameters such as different beauty products 1606 for each step 1608. Each step 1608 may have one or more beauty products 1606. For example, as illustrated in FIG. 17, screen 1700A, which may be step 1 1608A of AR tutorial 1600, includes beauty product 224A and beauty product 224B; and, screen 1700B, which may be step 2 1608B, includes beauty product 1706A and beauty product 1706B.

Each step, such as 1608A, 1608B, and 1608C, may indicate a different step in a tutorial. In one example, step 1 1608A is a cleanse with a beauty product 1606A, step 2 1608B is applying a foundation with a beauty product 1606B, and step 3 1608C is applying a blush with a beauty product 1606C.

FIG. 17 illustrates forward 1604 and back 1602 of FIG. 16, in accordance with some embodiments. Camera 130, screen 132, AR tutorial display 143, AR user display 144, and mobile device 146 are the same or similar as the elements with like numbers of FIG. 1. Presenter 236, beauty products 224, playback speed value 210, playback speed bar 414, user 238, play bar 422, step marks 426, back 428, capture 432, tutorial motion 216, tutorial effects 218, AR motion 217, AR effects 219, current play 424A, 424B, time in tutorial 430A, 430B are the same or similar as the elements with like numbers of FIG. 4. Forward 1604, back 1602, and AR tutorial 1600 is the same or similar as AR tutorial 1600 of FIG. 16.

As illustrated in FIG. 17, the screen 1700A indicates that step 1, such as step 1 1608A, is over. The user 238 may invoke forward 1604 by selecting next 1702, in accordance with some embodiments. Forward 1604 is a command 112, in accordance with some embodiments. The user 238 may invoke forward 1604 by moving the current play 424A after step mark 426A, in accordance with some embodiments. The user 238 may invoke back 1602 by selecting back 426, in accordance with some embodiments. AR tutorial 1600 may respond to back 1602 by moving the current play 424A to a position within a previous step 1608A, 1608B, 1608C. Back 1602 is a command 112. The user 238 may invoke back 1602 by moving current play 424B to a position before step mark 426A so that current play 424B is within a previous step. The user 238 may move among the steps 1608A, 1608B, 1608C in a different way.

Figure 18:
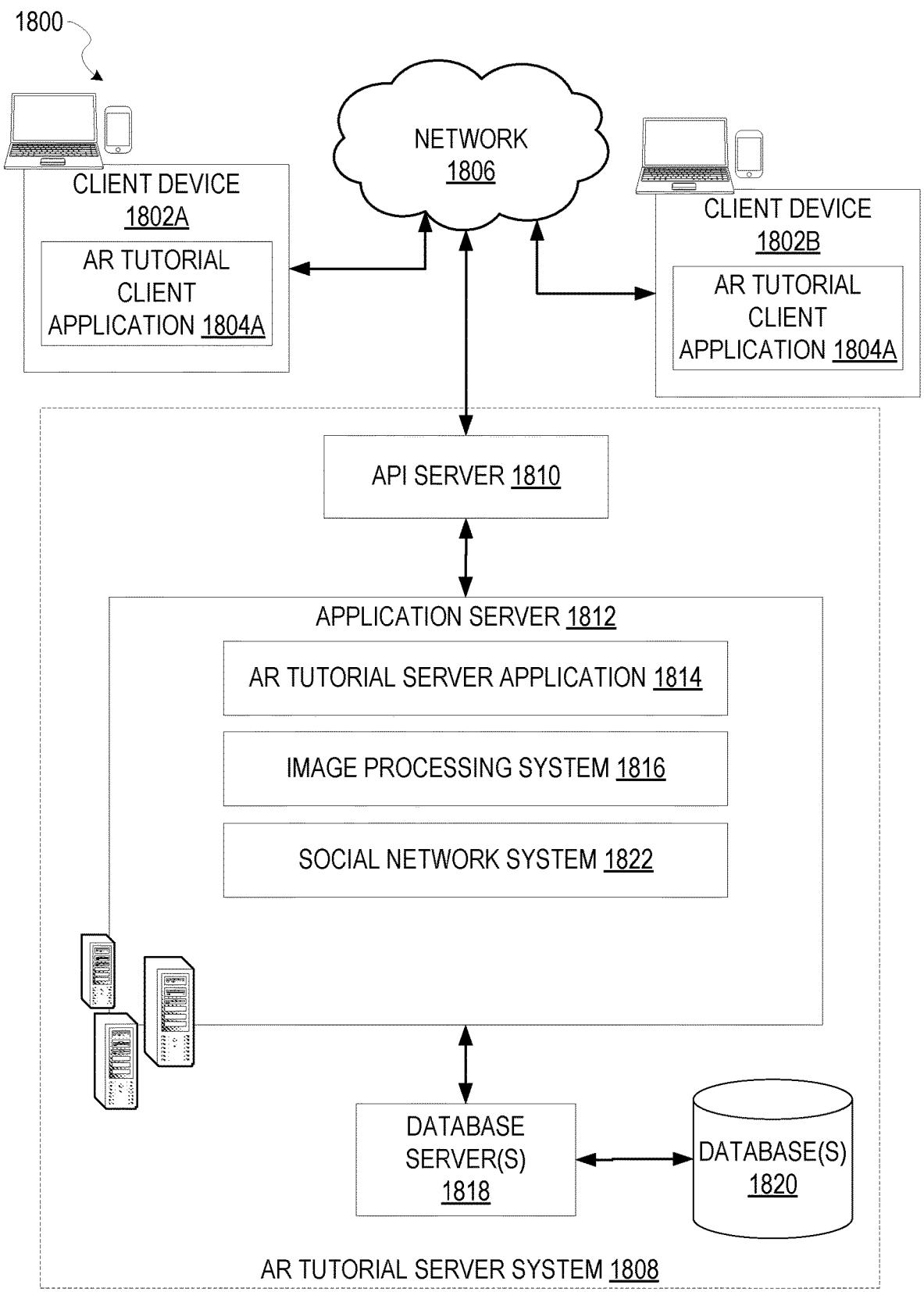
FIG. 18 is a block diagram showing an example of an AR tutorial system, in accordance with some embodiments.

FIG. 18 is a block diagram showing an example of an AR tutorial system 1800, in accordance with some embodiments. The AR tutorial system 1800 includes a client device 102, which hosts a number of applications including an AR tutorial application 1804. Client device 1802 includes AR tutorial client application 1814, which is communicatively coupled to a messaging server system 1808 via a network 1806 (e.g., the Internet).

AR tutorial client application 1814 is able to communicate and exchange data with the AR tutorial server system 1808 via the network 1806. The data exchanged between AR tutorial client application 1814 and AR tutorial server system 1808, includes functions (e.g., commands to invoke functions) as well as payload data (e.g., text, audio, video or other multimedia data). For example, AR tutorial application 1804 may be the same or similar as AR tutorial module 1802 and the data exchanged may include AR tutorial client application 1814. AR tutorial server system 1808 may include AR tutorial data 202, beauty product date 302, and the AR tutorial server application 1814, which may be downloaded to the client device 1802. AR tutorial client application 1804 and/or AR tutorial service application 1814 may be the same or similar as AR tutorial module 102.

The AR tutorial server system 1808 provides server-side functionality via the network 1806 to AR tutorial client application 1804. While certain functions of the AR tutorial system 1800 are described herein as being performed by either AR tutorial client application 1804 or by the AR tutorial server system 1808, the location of certain functionality either within the AR tutorial client application 1804 or the AR tutorial server system 1808 is a design choice. For example, it may be technically preferable to initially deploy certain technology and functionality within the AR tutorial server system 1808, but to later migrate this technology and functionality to the AR tutorial client application 1804 where a client device 1802 has a sufficient processing capacity. In some embodiments, AR tutorial server application 1814 provides functionality to the AR tutorial client application 1804 with regards to AR tutorials.

The AR tutorial server system 1808 supports various services and operations that are provided to the AR tutorial client application 1804. Such operations include transmitting data to, receiving data from, and processing data generated by the AR tutorial client application 1804. This data may include, AR tutorial module 1802, AR tutorial data 1902, beauty product data 2002, client device information, geolocation information, media annotation and overlays, social network information, and live event information, as examples. Data exchanges within the AR tutorial system 1800 are invoked and controlled through functions available via user interfaces (UIs) of the AR tutorial client application 1804.

Turning now specifically to the AR tutorial system 1800, an Application Program Interface (API) server 1810 is coupled to, and provides a programmatic interface to, an application server 1812. The application server 1812 is communicatively coupled to a database server 1818, which facilitates access to a database 1820 in which is stored data associated with AR tutorial client application 1804 and AR tutorial server application 1814.

API server 1810 receives and transmits data between client devices 1802 and application server 1812. Specifically, the API server 1810 provides a set of interfaces (e.g., routines and protocols) that can be called or queried by the AR tutorial client application 1804 in order to invoke functionality of the application server 1812. The API server 1810 exposes various functions supported by the application server 1812, including account registration, login functionality, the sending/receiving of data and applications, via the application server 1812, to/from AR tutorial client application 1804. The data and applications may include AR tutorial module 102, AR tutorial data 202, beauty product data 302, media files (e.g., AR tutorials or advertisements for AR tutorials). The data may be sent from client device 1802A to client device 1802B via AR tutorial server system 1808. For example, client device 1802A may create AR tutorial data 202 and client device 1802B may download the AR tutorial data 202 and execute AR tutorial module 102 with AR tutorial data 202 from client device 1802B. Additionally, client devices 1802 may access the Internet via AR tutorial server system 1808, in accordance with some embodiments. AR tutorial server system 1808 provides access to client devices 1802 other data including a collection of media data (e.g., tutorial or story), the retrieval of a list of friends of a user of a client device 1802, the retrieval of such collections, the retrieval of messages and content, the adding and deletion of friends to a social graph, the location of friends within a social graph, opening an application event (e.g., relating to AR tutorial client application 1804), and searching for AR tutorials.

The application server 1812 hosts a number of applications and subsystems, including an AR tutorial server application 1814, an image processing system 1816, and a social network system 1822. The AR tutorial server application 1814 implements a number of AR tutorial processing technologies and functions, particularly related to the advertising for AR tutorials, creation of AR tutorials, and playing of AR tutorials. As disclosed herein, text and media content from multiple sources may be aggregated into collections of content (e.g., called stories, galleries, or AR tutorials). The application server 1812 also includes an image processing system 1816 that is dedicated to performing various image processing operations, typically with respect to images or video received within the payload of a message at the AR tutorial client application 1804. For example, in some embodiments, image processing system 1816 may perform one or more of the functions of determine body part module 124, determine effects module 128, or determine motion module 122.

Figure 20:
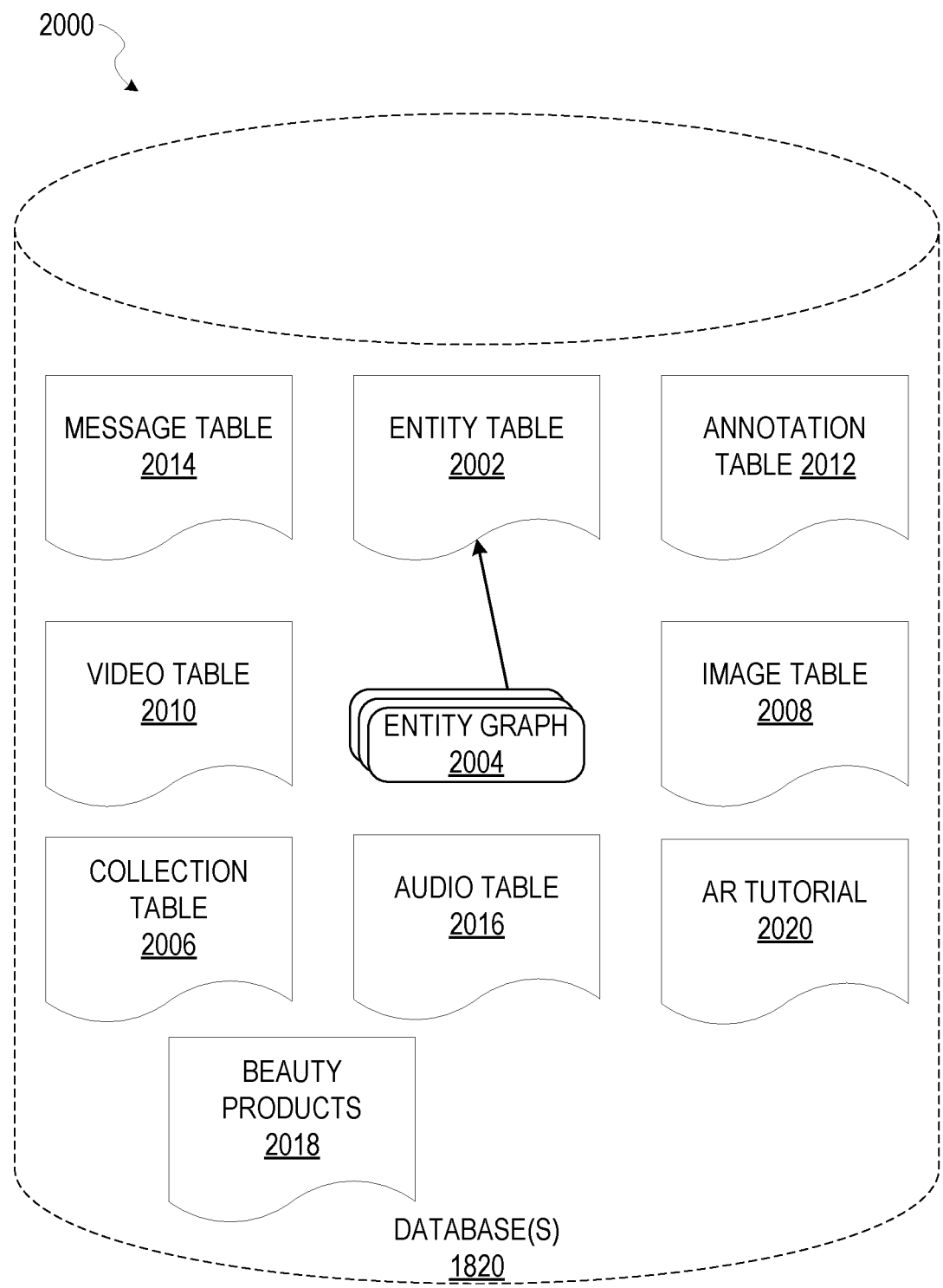
FIG. 20 is a schematic diagram illustrating data structures which may be stored in the database of the AR tutorial server system, according to certain example embodiments.

The Application server 1822 supports various social networking functions and services, and makes these functions and services available to the AR tutorial application 1814. To this end, the social network system 1822 maintains and accesses an entity graph 2004 (as shown in FIG. 20) within the database 1820. Examples of functions and services supported by the social network system 1822 include the identification of other users of the AR tutorial system 1800 with which a particular user has relationships or is "following", and also the identification of other entities and interests of a particular user, e.g., users that have provided AR tutorials. The application server 1812 is communicatively coupled to a database server 1818, which facilitates access to a database 1820 in which is stored data associated with AR tutorials processed by the AR tutorial application 1814.

Figure 19:
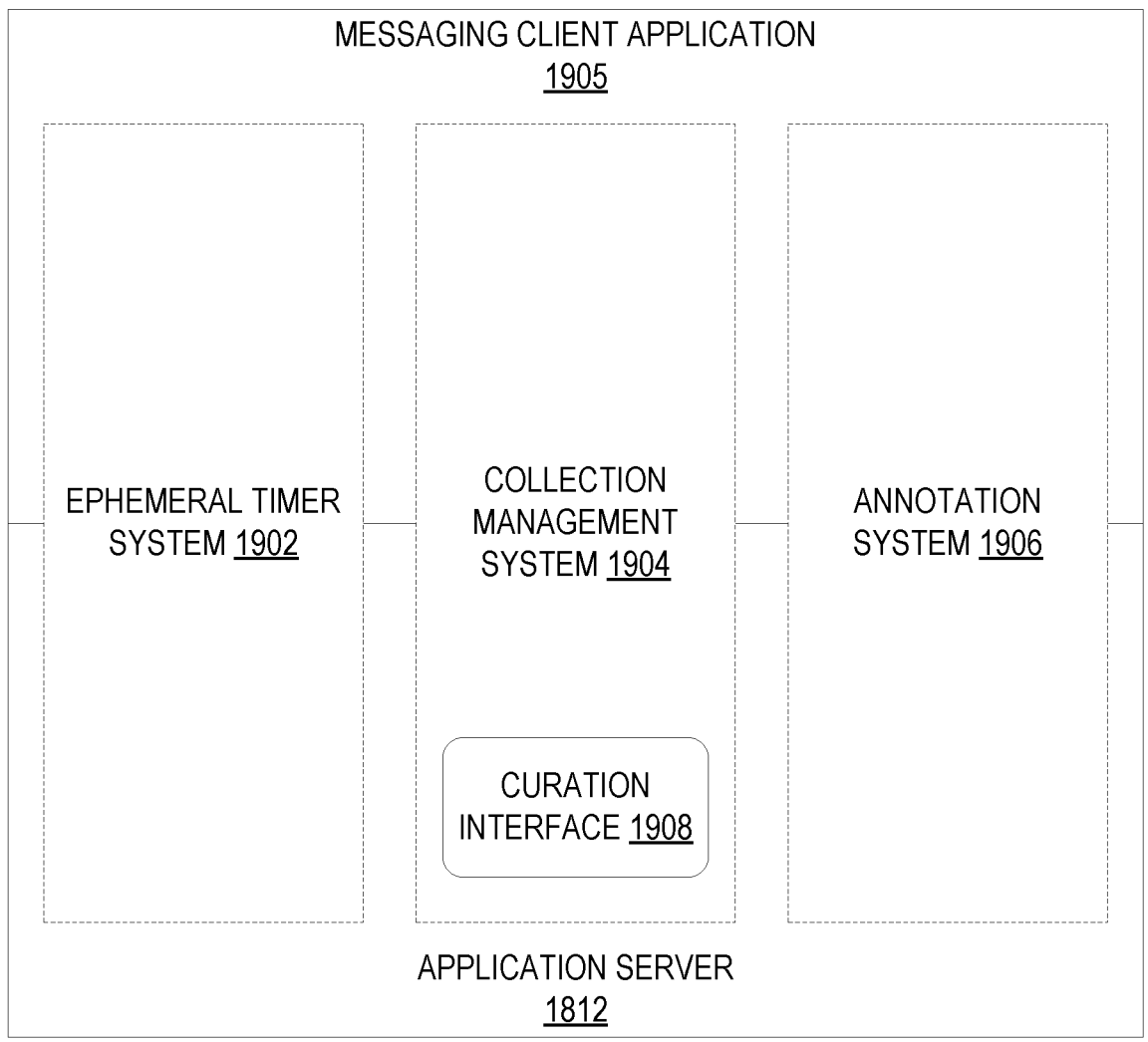
FIG. 19 is block diagram illustrating further details regarding the AR tutorial system, according to example embodiments.

FIG. 19 is block diagram illustrating further details regarding the AR tutorial system 1800, according to example embodiments. The client devices 1802 may include a messaging client application 1905, which may include an ephemeral timer system 1902, a collection management system 1904 and an annotation system 1906. For example, the messaging client application 2105 may be used to edit, enhance, and/or send the screen of client device 1802 as a message or save as a story.

The application server 1812 may include a message server application 1914. The ephemeral timer system 1902 is responsible for enforcing temporary access to content permitted by messaging client application 1905 and messaging server application 1914. To this end, the ephemeral timer system 1902 incorporates a number of timers that, based on duration and display parameters associated with a message, or collection of messages (e.g., a story), selectively display and enable access to messages and associated content via the messaging client application 1905.

The collection management system 1904 is responsible for managing collections of media (e.g., collections of text, image video, AR tutorials data, beauty products, and audio data). In some examples, a collection of content (e.g., messages, including images, video, text and audio) may be organized into an "event gallery" or an "event story" and/or as a "Make Over Tutorial." Such a collection may be made available for a specified time period, such as the duration of an event to which the content relates. For example, content relating to a music concert may be made available as a "story" for the duration of that music concert. The collection management system 1904 may also be responsible for publishing an icon that provides notification of the existence of a particular collection to the user interface of the AR tutorial client application 1804.

The collection management system 1904 furthermore includes a curation interface 1908 that allows a collection manager to manage and curate a particular collection of content. For example, the curation interface 1908 enables an event organizer to curate a collection of content relating to a specific event (e.g., delete inappropriate content or redundant messages). Additionally, the collection management system 1904 employs machine vision (or image recognition technology) and content rules to automatically curate a content collection. In certain embodiments, compensation may be paid to a user for inclusion of user-generated content into a collection. In such cases, the curation interface 1908 operates to automatically make payments to such users for the use of their content.

The annotation system 1906 provides various functions that enable a user to annotate or otherwise modify or edit media content associated with a message. For example, the annotation system 1906 provides functions related to the generation and publishing of media overlays for messages processed by the AR tutorial system 1800. The annotation system 1906 operatively supplies a media overlay or supplementation (e.g., an image filter) to the messaging client application 1905 based on a geolocation of the client device 2102. In another example, the annotation system 1906 operatively supplies a media overlay to the messaging client application 1905 based on other information, such as social network information of the user of the client device 1802. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 1802. For example, the media overlay may include text that can be overlaid on top of a photograph taken by the client device 2102. In another example, the media overlay includes an identification of a location overlay (e.g., Venice beach), a name of an AR tutorial, a name of show that provides AR tutorials, a name of a live event, or a name of a merchant overlay (e.g., Beach Coffee House). In another example, the annotation system 1906 uses the geolocation of the client device 2102 to identify a media overlay that includes the name of a merchant at the geolocation of the client device 2102. The media overlay may include other indicia associated with the merchant. The media overlays may be stored in the database 1820 and accessed through the database server 1818.

In one example embodiment, the annotation system 1906 provides a user-based publication platform that enables users to select a body part and upload content associated with the body part for AR tutorials. The user may also specify circumstances under which a particular media overlay should be offered to other users. The annotation system 1906 generates a media overlay that includes the uploaded content and associates the uploaded content with the selected body part to enable a user of the user device 1802 to search for AR tutorial based on the body part.

In another example embodiment, the annotation system 1906 provides a merchant-based publication platform that enables merchants to select a particular media overlay associated with a body part via a bidding process. For example, the annotation system 1906 associates the media overlay of a highest bidding merchant with a corresponding body part for a predefined amount of time.

FIG. 20 is a schematic diagram illustrating data structures 2000 which may be stored in the database 1820 of the AR tutorial server system 1808, according to certain example embodiments. While the content of the database 1820 is shown to comprise a number of tables, it will be appreciated that the data could be stored in other types of data structures (e.g., as an object-oriented database).

The database 1920 includes message data stored within a message table 2014. The entity table 2002 stores entity data, including an entity graph 2004. Entities for which records are maintained within the entity table 2002 may include individuals, corporate entities, organizations, objects, places, events, etc. Regardless of type, any entity regarding which the AR tutorial server system 1808 stores data may be a recognized entity. Each entity is provided with a unique identifier, as well as an entity type identifier (not shown).

The entity graph 2004 furthermore stores information regarding relationships and associations between entities. Such relationships may be social, professional (e.g., work at a common corporation or organization) interested-based or activity-based, merely for example.

The database 1820 also stores annotation data, in the example form of filters, in an annotation table 2012. Filters for which data is stored within the annotation table 2012 are associated with and applied to AR tutorials, videos (for which data is stored in a video table 2010), and/or images (for which data is stored in an image table 2008). Filters, in one example, are overlays that are displayed as overlaid on an AR tutorial, image, or video during presentation to a recipient user. Filters may be of varies types, including user-selected filters from a gallery of filters presented to a sending user by the messaging client application 2205 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 2205, based on geolocation information determined by a GPS unit of the client device 2102. Another type of filer is a data filer, which may be selectively presented to a sending user by the messaging client application 2205, based on other inputs or information gathered by the client device 1802 during the message creation process. Example of data filters include current temperature at a specific location, a current presenter of an AR tutorial, a current show providing AR tutorial content, a current body part, a current beauty product, a current speed at which a sending user is traveling, battery life for a client device 1802, or the current time.

Other annotation data that may be stored within the image table 2008 is data corresponding to LENSES®. LENSES® are a type of media overlay in accordance with some embodiments. One example of a media overlay is a real-time special effect and sound that may be added to an image or video. The media overlay may include effects of an AR tutorial. In some embodiments, an AR tutorials may be termed a LENSES®.

The video table 2010 stores video data which, in one embodiment, is associated with messages, beauty data, or AR tutorials for which records are maintained within the message table 2014. Similarly, the image table 2008 stores image data associated with messages for which message data is stored in the entity table 2002. The entity table 2002 may associate various annotations from the annotation table 2012 with various AR tutorials, beauty products, images, and videos stored in the image table 2008 and the video table 2010.

The audio table 2016 stores audio data which, in one embodiment, is associated with messages or AR tutorials for which records are maintained within the message table 2014. Similarly, the audio table 2016 stores audio data associated with messages or AR tutorials for which message data or AR tutorial data is stored in the entity table 2002. The entity table 2002 may associate various annotations from the annotation table 2012 with various audio data stored in the audio table 2016 or AR tutorials stored in the AR tutorial data 2020. Audio data may be associated with video data, message data, story data, AR tutorial data, beauty products, or other types of data via the entity graph 2004. In some embodiments, the audio table 316 stores songs.

A collection table 2006 stores data regarding collections of AR tutorials, beauty products, messages and associated image, video, or audio data, which are compiled into a collection (e.g., story, collection, make over, body part, presentation of images, or a gallery). The creation of a particular collection may be initiated by a particular user (e.g., each user for which a record is maintained in the entity table 2002). A user may create a user collection or "personal story" in the form of a collection of content that has been created and sent/broadcast by that user. To this end, the user interface of the messaging client application 2104 may include an icon that is user-selectable to enable a sending user to add specific content to his or her user collection or personal story.

A collection may also constitute a "live story," which is a collection of content from multiple users that is created manually, automatically, or using a combination of manual and automatic techniques. For example, a contemporaneous collection or "live story" may constitute a curated stream of user-submitted content from varies locations, events, beauty products, or body parts. Users whose client devices have location services enabled and are at a common location event at a particular time may, for example, be presented with an option, via a user interface of the messaging client application 1804, to contribute content to a particular contemporaneous collection or live story. The contemporaneous collection or live story may be identified to the user by the messaging client application 1804, based on his or her location. The end result is a contemporaneous collection or "live story" told from a community perspective.

A further type of content collection is known as a location collection or "location story", which enables a user whose client device 1802 is located within a specific geographic location (e.g., on a college or university campus) to contribute to a particular collection. In some embodiments, a contribution to a location collection or location story may require a second degree of authentication to verify that the end user belongs to a specific organization or other entity (e.g., is a student on the university campus). AR tutorial data 2020 includes AR tutorial data 202 as disclosed herein. Beauty products 2018 includes beauty product data 302 as disclosed herein. In some embodiments, content collection may be known as a "make over" and be associated with a body part, a show that provides AR tutorial content, and/or a presenter.

Figure 21:
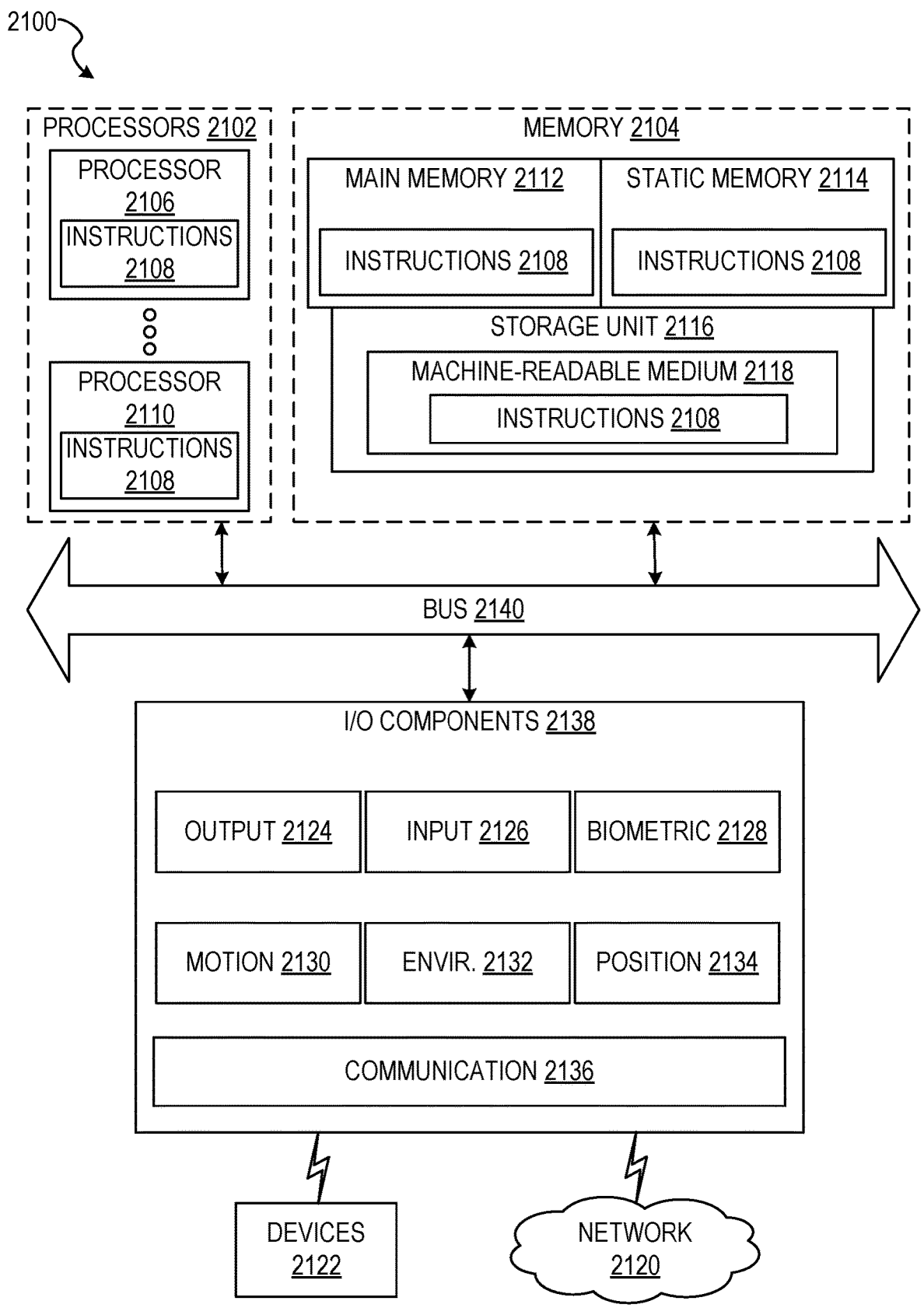
FIG. 21 is a diagrammatic representation of the machine within which instructions (e.g., software, a program, an application, an applet, an app, or other executable code) for causing the machine to perform any one or more of the methodologies discussed herein may be executed.

FIG. 21 is a diagrammatic representation of the machine 2100 within which instructions 2108 (e.g., software, a program, an application, an applet, an app, or other executable code) for causing the machine 2100 to perform any one or more of the methodologies discussed herein may be executed. For example, the instructions 2108 may cause the machine 2100 to execute any one or more of the methods and/or functions described herein. The instructions 2108 transform the general, non-programmed machine 600 into a particular machine 2100 programmed to carry out the described and illustrated functions in the manner described. The machine 2100 may operate as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2108, sequentially or otherwise, that specify actions to be taken by the machine 2100. Further, while only a single machine 2100 is illustrated, the term "machine" shall also be taken to include a collection of machines that individually or jointly execute the instructions 2108 to perform any one or more of the methodologies discussed herein. In some embodiments, an apparatus of the machine 2100 is configured to perform one or more of the functions as disclosed herein.

The machine 2100 may include processors 2102, memory 2104, and I/O components 2138, which may be configured to communicate with each other via a bus 2140. In an example embodiment, the processors 2102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another processor, or any suitable combination thereof) may include, for example, a processor 2106 and a processor 2110 that execute the instructions 2108. The term "processor" is intended to include multi-core processors that may comprise two or more independent processors (sometimes referred to as "cores") that may execute instructions contemporaneously. Although FIG. 21 shows multiple processors 2102, the machine 2100 may include a single Processor with a single core, a single Processor with multiple cores (e.g., a multi-core Processor), multiple processors with a single core, multiple processors with multiples cores, or any combination thereof.

The memory 2104 includes a main memory 2112, a static memory 2114, and a storage unit 2116, both accessible to the processors 2102 via the bus 2140. The main memory 2104, the static memory 2114, and storage unit 2116 store the instructions 2108 embodying any one or more of the methodologies or functions described herein. The instructions 2108 may also reside, completely or partially, within the main memory 2112, within the static memory 2114, within machine-readable medium 2118 within the storage unit 2116, within at least one of the processors 2102 (e.g., within the Processor's cache memory), or any suitable combination thereof, during execution thereof by the machine 2100.

The I/O components 2138 may include a wide variety of components to receive input, provide output, produce output, transmit information, exchange information, capture measurements, and so on. The specific I/O components 2138 that are included in a particular machine will depend on the type of machine. For example, portable machines such as mobile phones may include a touch input device or other such input mechanisms, while a headless server machine will likely not include such a touch input device. It will be appreciated that the I/O components 2138 may include many other components that are not shown in FIG. 21. In various example embodiments, the I/O components 2138 may include user output components 2124 and user input components 2126. The user output components 2124 may include visual components (e.g., a display such as a plasma display panel (PDP), a light emitting diode (LED) display, a liquid crystal display (LCD), a touch screen, a projector, or a cathode ray tube (CRT)), acoustic components (e.g., speakers), haptic components (e.g., a vibratory motor, resistance mechanisms), other signal generators, and so forth. The user input components 2126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2138 may include biometric components 2128, motion components 2130, environmental components 2132, or position components 2134, among a wide array of other components. For example, the biometric components 2128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2130 include acceleration sensor components (e.g., accelerometer), gravitation sensor components, rotation sensor components (e.g., gyroscope). The environmental components 2132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2134 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 2138 further include communication components 2136 operable to couple the machine 2100 to a network 2120 or devices 2122 via respective coupling or connections. For example, the communication components 2136 may include a network interface Component or another suitable device to interface with the network 2120. In further examples, the communication components 2136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2122 may be another machine or any of a wide variety of peripheral devices (e.g., a peripheral device coupled via a USB).

Moreover, the communication components 2136 may detect identifiers or include components operable to detect identifiers. For example, the communication components 2136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2136, such as location via Internet Protocol (IP) geolocation, location via Wi-Fi® signal triangulation, location via detecting an NFC beacon signal that may indicate a particular location, and so forth.

The various memories (e.g., main memory 2112, static memory 2114, and/or memory of the processors 2102) and/or storage unit 2116 may store one or more sets of instructions and data structures (e.g., software) embodying or used by any one or more of the methodologies or functions described herein. These instructions (e.g., the instructions 2108), when executed by processors 2102, cause various operations to implement the disclosed embodiments.

The instructions 2108 may be transmitted or received over the network 2120, using a transmission medium, via a network interface device (e.g., a network interface Component included in the communication components 2136) and using any one of several well-known transfer protocols (e.g., hypertext transfer protocol (HTTP)). Similarly, the instructions 2108 may be transmitted or received using a transmission medium via a coupling (e.g., a peer-to-peer coupling) to the devices 2122.

Figure 22:
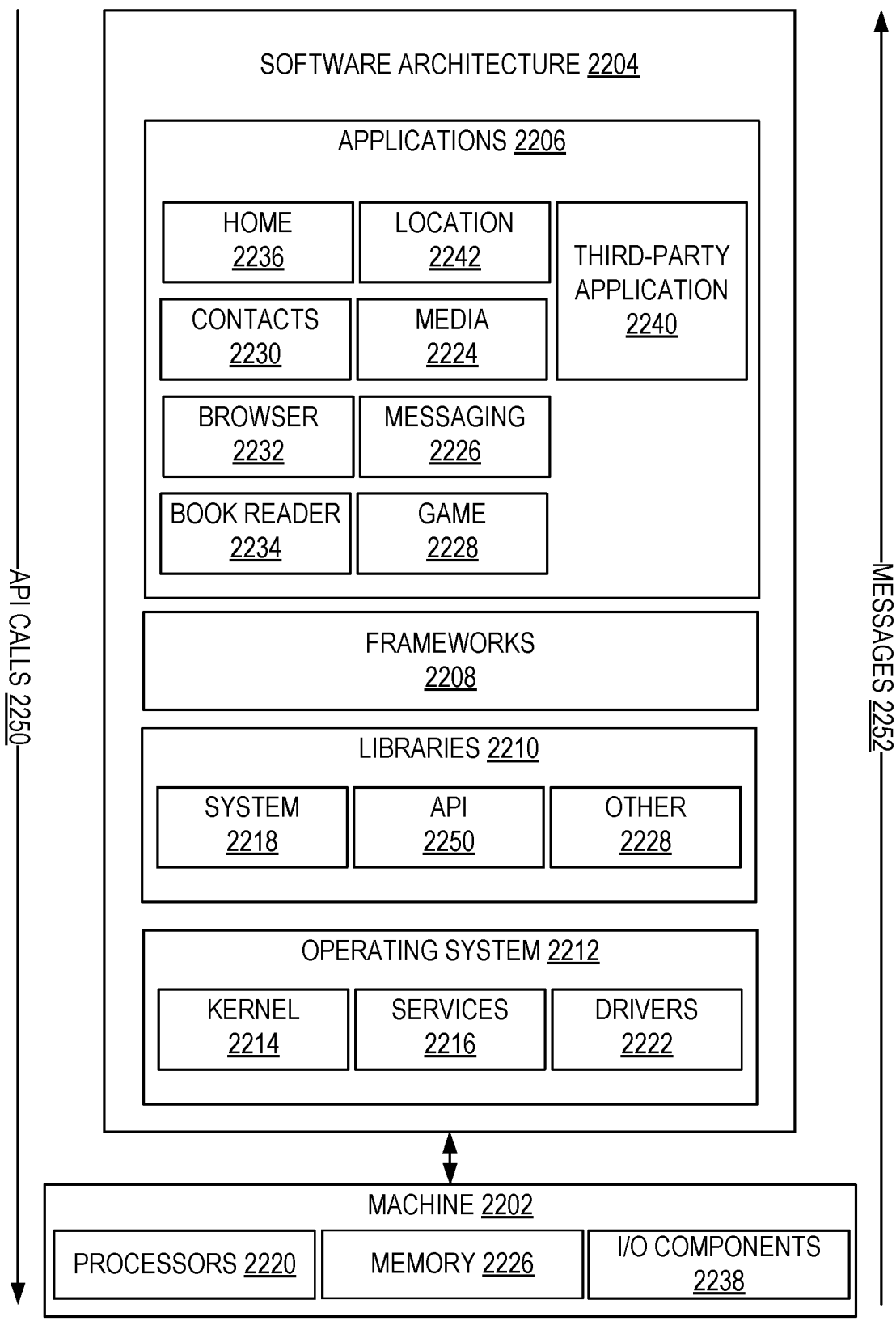
FIG. 22 is a block diagram illustrating a software architecture, which can be installed on any one or more of the devices described herein.

FIG. 22 is a block diagram 2200 illustrating a software architecture 2204, which can be installed on any one or more of the devices described herein. The software architecture 2204 is supported by hardware such as a machine 2202 that includes processors 2220, memory 2226, and I/O components 2238. Machine 2202 is the same or similar as machine 2100, in accordance with some embodiments. In this example, the software architecture 2204 can be conceptualized as a stack of layers, where each layer provides a particular functionality. The software architecture 2204 includes layers such as an operating system 2212, libraries 2210, frameworks 2208, and applications 2206. Operationally, the applications 2206 invoke API calls 2250 through the software stack and receive messages 2252 in response to the API calls 2250.

The operating system 2212 manages hardware resources and provides common services. The operating system 2212 includes, for example, a kernel 2214, services 2216, and drivers 2222. The kernel 2214 acts as an abstraction layer between the hardware and the other software layers. For example, the kernel 2214 provides memory management, Processor management (e.g., scheduling), Component management, networking, and security settings, among other functionality. The services 2216 can provide other common services for the other software layers. The drivers 2222 are responsible for controlling or interfacing with the underlying hardware. For instance, the drivers 2222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 2210 provide a low-level common infrastructure used by the applications 2206. The libraries 2210 can include system libraries 2218 (e.g., C standard library) that provide functions such as memory allocation functions, string manipulation functions, mathematic functions, and the like. In addition, the libraries 2210 can include API libraries 2224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2210 can also include a wide variety of other libraries 2228 to provide many other APIs to the applications 2206.

The frameworks 2208 provide a high-level common infrastructure that is used by the applications 2206. For example, the frameworks 2208 provide various graphical user interface (GUI) functions, high-level resource management, and high-level location services. The frameworks 2208 can provide a broad spectrum of other APIs that can be used by the applications 2206, some of which may be specific to a particular operating system or platform.

In an example embodiment, the applications 2206 may include a home application 2236, a contacts application 2230, a browser application 2232, a book reader application 2234, a location application 2242, a media application 2244, a messaging application 2246, a game application 2248, and a broad assortment of other applications such as a third-party application 2240. The applications 2206 are programs that execute functions defined in the programs. Various programming languages can be employed to create one or more of the applications 2206, structured in a variety of manners, such as object-oriented programming languages (e.g., Objective-C, Java, or C++) or procedural programming languages (e.g., C or assembly language). In a specific example, the third-party application 2240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2240 can invoke the API calls 2250 provided by the operating system 2212 to facilitate functionality described herein.

Figure 23:
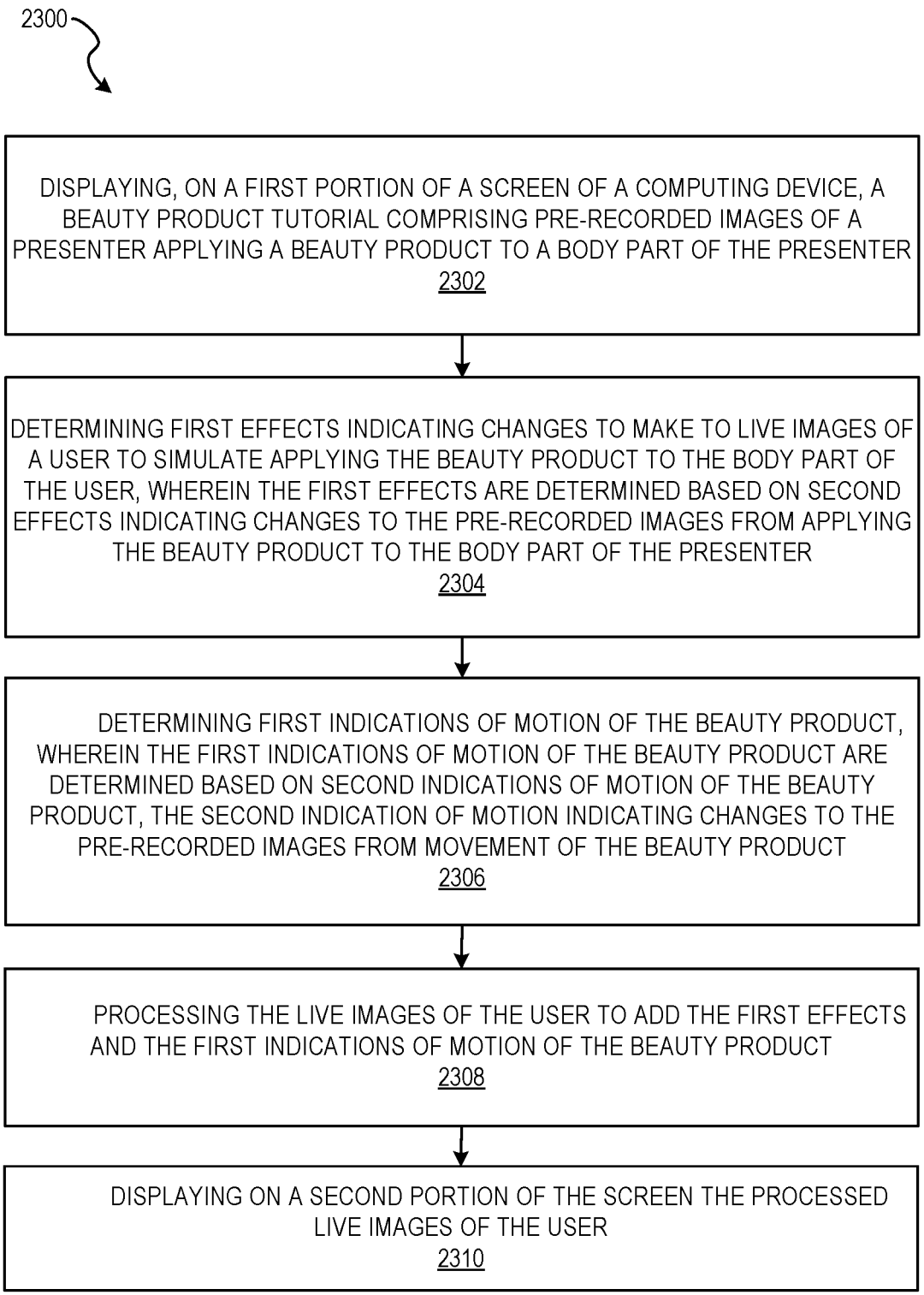
FIG. 23 illustrates a method of providing augmented reality beauty product tutorials, in accordance with some embodiments.

FIG. 23 illustrates a method 2300 of providing augmented reality beauty product tutorials, in accordance with some embodiments. The method 2300 begins at operation 2302 with displaying, on a first portion of a screen of a computing device, a beauty product tutorial comprising pre-recorded images of a presenter applying a beauty product to a body part of the presenter. For example, as disclosed in conjunction with FIG. 4, an AR tutorial 143 is displaying presenter 236 on AR tutorial display 142 of a screen 132 of a computing device 146 with beauty products 224 being applied to body part 224A. Additionally, as disclosed in conjunction with FIG. 1, generate tutorial images module 104 is configured to generate AR tutorial images 138 to be displayed on AR tutorial display 142 from AR tutorial data 202, which includes in each step N 204 a body part 222, beauty product 224, and presenter 236. In other examples, FIGS. 5A, 5B, 5C, and 12 illustrate examples of operation 2302.

The method 2300 continues at operation 2304 with determining first effects indicating changes to make to live images of a user to simulate applying the beauty product to the body part of the user, where the first effects are determined based on second effects indicating changes to the pre-recorded images from applying the beauty product to the body part of the presenter. For example, as disclosed in conjunction with FIG. 1, determine effects module 128 is configured to determine the AR effects 219 of FIGS. 2, 4, 5A, 5B, 5C, 8, 11, 12, 13, and 14 from tutorial effects 218 and/or AR tutorial video 228. FIGS. 5A, 5B, and 5C illustrate an example of adding AR effects 219A, 219B, 219C, to a body part 222 that is a right eye of a user 238 from tutorial effects 218A, which are the changes to a right eye of a presenter 236 from applying beauty product 224B with beauty product 224A. FIGS. 5A, 5B, and 5C illustrate the progression of the application of the eye shadow where the changes to the right eye of the user 238 with the AR effects 219A, 219B, and 219C are synchronized with the changes to the right eye of the presenter 236, which are indicated by tutorial effects 218A, 218B, and 218C.

The method 2300 continues at operation 2306 with determining first indications of motion of the beauty product, where the first indications of motion of the beauty product are determined based on second indications of motion of the beauty product, the second indication of motion indicating changes to the pre-recorded images from movement of the beauty product.

For example, determine motion module 122 is configured to determine AR motion 217 of FIGS. 2, 4, 5A, 5B, 5C, and 12 from tutorial motion 216. FIGS. 5A, 5B, and 5C illustrate an example of adding AR motion 217A, 217B, 217C, to AR user display 140 as displayed on AR user display 144 from tutorial motion 216A, which are the indications of motion of a beauty product 224A in AR tutorial video 228. FIGS. 5A, 5B, and 5C illustrate the synchronized 434 movement of beauty product 224A, 224B, and 224C by presenter 236 with the addition of AR motion 217A, 217B, and 217C, respectively. In some embodiments, tutorial motion 216 is predetermined.

The method 2300 continues at operation 2308 with processing the live images of the user to add the first effects and the first indications of motion of the beauty product. For example, as disclosed in conjunction with FIG. 1 generate user images module 108 takes the live images 134 of the user 238 and adds the AR motion 217 and AR effects 219 to the live images 134 to be displayed on AR user display 144 of FIGS. 1, 4, 5A, 5B, 5C, 8, 10, 11, 12, 13, and 14.

The method 2300 continues at operation 2310 with displaying on a second portion of the screen the processed live images of the user. For example, generate user images module 108 displays AR user images 140 of FIG. 1 on AR user display 144 of FIGS. 1, 4, 5A, 5B, 5C, 8, 10, 11, 12, 13, and 14. In some embodiments, a module of AR tutorial module 102 displays Ar user images 140 on AR user display 144 of screen 132. In some embodiments, a module of client device 1802A, 1802B of FIG. 18 displays AR user images 140 on AR user display 144 of screen 132.

One or more of the operations of method 2300 may be optional. Method 2300 may include one or more additional operations. Operations of method 2300 may be performed in a different order, in accordance with some embodiments.

The method 2300 may further include an operation where the pre-recorded images and the processed images are displayed so that the first effects are displayed simultaneously with corresponding second effects. For example, as disclosed in conjunction with FIG. 1, synchronize effects and motion module 106 is configured to cause the AR tutorial video 228 and the processed video of AR user images 140 to be displayed so that the tutorial effects 218 are displayed simultaneously with corresponding AR effects 219. In another example, as disclosed in conjunction with FIGS. 5A, 5B, and 5C illustrate the synchronized 434 or simultaneous display of the application of the tutorial effects 218A, 218B, 218C to the presenter 236 with the application of the AR effects 219A, 219B, 219C, respectively, to the user 238.

The method 2300 may further include an operation where the pre-recorded images and the processed images are displayed so that the first indications of motion are displayed simultaneously with corresponding second indications of motion. For example, as disclosed in conjunction with FIG. 1, synchronize effects and motion module 106 is configured to cause the AR tutorial video 228 and the processed video of AR user images 140 to be displayed so that the tutorial motion 216 are displayed simultaneously with corresponding AR motion 217. In another example, as disclosed in conjunction with FIGS. 5A, 5B, and 5C illustrate the synchronized 434 or simultaneous display of the tutorial motion 216A, 216B, and 216C of the beauty product 224A by the presenter 236 with the display of the AR motion 217A, 217B, and 217C, respectively.

The method 2300 may further include determining within the live images of the user a body part of the user corresponding to the body part of the presenter, and adjusting the second portion of the screen to display the body part of the user in a size proportional to a size of the body part of the presenter displayed in the pre-recorded images. For example, determine body part module 124 is configured to determine body part 222 of the user 238 within the live images 134. In another example, as disclosed in conjunction with FIG. 4, determine body part 222 determines that the AR tutorial 143 step N 202 regards a right eye as the body part 222. In another example, generate user images module 108 is configured to adjust the AR user display 144 the screen 132 to display on AR user display 144 the body part 222 of the user 238 in a size proportional to a size of the body part 222 of the presenter 236 displayed in the AR tutorial video 228. For example, as disclosed in conjunction with FIG. 4, the right eye of the user 238 is displayed in a size proportional to the right eye of the presenter 236.

The method 2300 may further include where the method is performed by an apparatus of the computing device. For example, in some embodiments, an apparatus of machine 2100 of FIG. 21 may perform method 2300. For example, only portions necessary to the mobile device 146 may perform the method 2300. For example, AR tutorial module 102 may include memory 2104 and processor 2102.

The method 2300 may further include receiving the live images from a camera of the computing device. For example, as disclosed in conjunction with FIG. 1, camera 130 may generate live images 134.

The method 2300 may further include displaying an image of the beauty product on the screen, and in response to a selection of the image of the beauty product, displaying additional information regarding the beauty product, the additional information regarding the beauty product comprising an option to purchase the beauty product. For example, generate user images module 108 and/or generate tutorial images module 104 may include images of beauty product 326 in the AR tutorial images 138 and/or AR user images 140. For example, as disclosed in conjunction with FIG. 4, images are displayed as beauty product 224A and beauty product 224B, which may be associated with step N 204. In some embodiments, respond to commands module 110 will respond to a selection of a beauty product such as beauty product 224B by displaying additional information such as screen 1500 of FIG. 15.

The method 2300 may further include an operation where the additional information further comprises an icon to customize the beauty product and in response to a selection of the icon to customize the beauty product, displaying options to customize the beauty product and in response to a selection of an option of the options to customize the beauty product, processing the live images of the user to modify the first effects based on the option to customize the beauty product. For example, as disclosed in conjunction with screen 1500, the user 238 may be provided options to customize the beauty product 224B. Continuing with the example, in screen 1500 the user 238 may select a color different from the current color 1216. In an example, customizing the beauty product is a customization 226 as disclosed in conjunction with FIG. 2.

The method 2300 may further include where the options to customize the beauty product include one or more of the following: changing a color of the beauty product, changing a brush size of the beauty product, changing an application size of the beauty product, and changing an application thickness of a beauty product. For example, a different color may be selected as illustrated in FIG. 15. The other customizations 226 that include changing a brush size of the beauty product, changing an application size of the beauty product, and changing an application thickness of a beauty product may be displayed in a similar fashion as color variant as displayed in screen 1500.

The method 2300 may further include where the beauty product is a first beauty product, the body part is a first body part, and in response to an indication to move to a next step of the beauty product tutorial, displaying, on the first portion of the screen of the computing device, a second beauty product tutorial comprising pre-recorded images of the presenter applying the second beauty product to a second body part of the presenter; determining third effects indicating changes to make to live images of the user to simulate applying the second beauty product to the second body part of the user, where the third effects are determined based on fourth effects indicating changes to the pre-recorded images from applying the second beauty product to the second body part of the presenter, determining third indications of motion of the second beauty product, where the third indications of motion of the second beauty product are determined based on fourth indications of motion of the second beauty product, the fourth indication of motion indicating changes to the pre-recorded images from movement of the second beauty product; processing second live images of the user to add the third effects and the third indications of motion of the beauty product; and displaying on the second portion of the screen the processed second live images of the user. For example, as illustrated in conjunction with FIG. 17 the user 238 may move to a different step N 202 of FIG. 2, which results in a different beauty product 1706A and 1706B being displayed.

The method 2300 may further include in response to a first indication from the user to capture an image, capturing a current live image, the current live image comprising the first effects, in response to a second indication from the user to send the image, sending the captured current live image. For example, as disclosed in conjunction with FIG. 12, a user 238 may select with her finger 810 capture 432, and, in response, respond to commands module 110 of FIG. 1 will capture the image of AR user display 144 of screen 1200A as AR user display 144 of screen 1200B or captured image 1214. The user 238 may select in screen 1200B send 1212 and, in response, respond to commands module 110 of FIG. 1 will send the captured image 1214 of AR user display 144. Additional examples are disclosed in conjunction with FIGS. 13 and 14.

The method 2300 may further include refraining from displaying on the first portion of the screen the beauty product tutorial during the displaying on the screen the captured current live image where the captured current live image is displayed on both the first portion and the second portion of the screen. For example, as disclosed in conjunction with FIGS. 13 and 14, captured image 1414 is displayed on a full screen 1400.

The method 2300 may further include sending the captured current live image as an ephemeral message. For example, respond to commands module 110 of FIG. 1 is configured to respond to send 1212 of FIG. 12 or send 1210 of FIG. 14 by sending an ephemeral message as disclosed in conjunction with FIG. 19. The method 2300 may further include in response to an indication to turn off augmented reality, processing second live images of the user to add the first indications of motion, and displaying on the screen the processed second live images of the user.

Some embodiments provide a technical solution to enabling a tutorial to be presented to a user with a live-view image of the user having AR effects added where the AR effects mirror the actions of a presenter of the tutorial. Some embodiments provide a technical solution to synchronizing motion and make-up effects of a prerecorded video with live view images of a user of a tutorial where the motion and make-up effects are added to the live view images. For example, as disclosed in conjunction with FIG. 1, generate user images module 108 is configured to display AR motion 217 without the AR effects 219 so that the user 238 can apply the beauty product 224 on the user themselves.

The following discussion relates to various terms or phrases that are mentioned throughout the subject disclosure. "Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In the subject disclosure, a client device is also referred to as an "electronic device." "Ephemeral Message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:

1. A method, comprising:
displaying, on a first portion of a screen of a computing device, a beauty product tutorial comprising pre-recorded images of a presenter applying a beauty product to a body part of the presenter;
determining first effects indicating changes to make to live images of a user to simulate applying the beauty product to the body part of the user, wherein the first effects are determined based on second effects indicating changes to the pre-recorded images from applying the beauty product to the body part of the presenter;
determining first indications of motion of the beauty product, wherein the first indications of motion of the beauty product are determined based on second indications of motion of the beauty product, the second indication of motion indicating changes to the pre-recorded images from movement of the beauty product;
processing the live images of the user to add the first effects and the first indications of motion of the beauty product; and
displaying on a second portion of the screen the processed live images of the user, wherein the pre-recorded images and the processed images are displayed so that the first effects are displayed simultaneously on the second portion of the screen with corresponding second effects.

2. The method of claim 1, wherein the pre-recorded images and the processed images are displayed so that the first indications of motion are displayed simultaneously with corresponding second indications of motion.

3. The method of claim 1 further comprising:
determining within the live images of the user a body part of the user corresponding to the body part of the presenter; and
adjusting the second portion of the screen to display the body part of the user in a size proportional to a size of the body part of the presenter displayed in the pre-recorded images.

4. The method of claim 1, wherein the method is performed by an apparatus of the computing device.

5. The method of claim 4 further comprising:
receiving the live images from a camera of the computing device.

6. The method of claim 1 further comprising:
displaying an image of the beauty product on the screen; and
in response to a selection of the image of the beauty product, displaying additional information regarding the beauty product, the additional information regarding the beauty product comprising an option to purchase the beauty product.

7. The method of claim 6, wherein the additional information further comprises an icon to customize the beauty product, and wherein the method further comprises:
in response to a selection of the icon to customize the beauty product, displaying options to customize the beauty product and in response to a selection of an option of the options to customize the beauty product, processing the live images of the user to modify the first effects based on the option to customize the beauty product.

8. The method of claim 7, wherein the options to customize the beauty product comprises one or more of the following group: changing a color of the beauty product, changing a brush size of the beauty product, changing an application size of the beauty product, and changing an application thickness of a beauty product.

9. The method of claim 1, wherein the beauty product is a first beauty product, the body part is a first body part wherein the method further comprises:
in response to an indication to move to a next step of the beauty product tutorial, displaying, on the first portion of the screen of the computing device, a second beauty product tutorial comprising pre-recorded images of the presenter applying the second beauty product to a second body part of the presenter;
determining third effects indicating changes to make to live images of the user to simulate applying the second beauty product to the second body part of the user, wherein the third effects are determined based on fourth effects indicating changes to the pre-recorded images from applying the second beauty product to the second body part of the presenter; determining third indications of motion of the second beauty product, wherein the third indications of motion of the second beauty product are determined based on fourth indications of motion of the second beauty product, the fourth indication of motion indicating changes to the pre-recorded images from movement of the second beauty product; processing second live images of the user to add the third effects and the third indications of motion of the beauty product; and displaying on the second portion of the screen the processed second live images of the user.

10. The method of claim 1 further comprising: in response to a first indication from the user to capture an image, capturing a current live image of second live images, the current live image comprising the first effects, displaying the captured current live image on the screen, and in response to a second indication from the user to send the image, sending the captured current live image.

11. The method of claim 10 further comprising: refraining from displaying on the first portion of the screen the beauty product tutorial during the displaying on the screen the captured current live image; and wherein the captured current live image is displayed on both the first portion and the second portion of the screen.

12. The method of claim 11 further comprising: sending the captured current live image as an ephemeral message.

13. The method of claim 1 further comprising: in response to an indication to turn off augmented reality, processing second live images of the user to add the first indications of motion, and displaying on the screen the processed second live images of the user.

14. A system comprising:
a processor;
a memory including instructions that, when executed by the processor, cause the processor to perform operations comprising:
displaying, on a first portion of a screen of a computing device, a beauty product tutorial comprising pre-recorded images of a presenter applying a beauty product to a body part of the presenter;

determining first effects indicating changes to make to live images of a user to simulate applying the beauty product to the body part of the user, wherein the first effects are determined based on second effects indicating changes to the pre-recorded images from applying the beauty product to the body part of the presenter;

determining first indications of motion of the beauty product, wherein the first indications of motion of the beauty product are determined based on second indications of motion of the beauty product, the second indication of motion indicating changes to the pre-recorded images from movement of the beauty product;

processing the live images of the user to add the first effects and the first indications of motion of the beauty product; and displaying on a second portion of the screen the processed live images of the user, wherein the pre-recorded images and the processed images are displayed so that the first indications of motion are displayed simultaneously on the second portion of the screen with corresponding second indications of motion.

15. The system of claim 14, wherein the pre-recorded images and the processed images are displayed so that the first effects are displayed simultaneously with corresponding second effects.

16. A non-transitory computer-readable medium comprising instructions, which when executed by a computing device, cause the computing device to perform operations comprising:

displaying, on a first portion of a screen of a computing device, a beauty product tutorial comprising pre-recorded images of a presenter applying a beauty product to a body part of the presenter;

determining first effects indicating changes to make to live images of a user to simulate applying the beauty product to the body part of the user, wherein the first effects are determined based on second effects indicating changes to the pre-recorded images from applying the beauty product to the body part of the presenter;

determining first indications of motion of the beauty product, wherein the first indications of motion of the beauty product are determined based on second indications of motion of the beauty product, the second indication of motion indicating changes to the pre-recorded images from movement of the beauty product;

processing the live images of the user to add the first effects and the first indications of motion of the beauty product; and displaying on a second portion of the screen the processed live images of the user, wherein the pre-recorded images and the processed images are displayed so that the first effects are displayed simultaneously on the second portion of the screen with corresponding second effects.

17. The non-transitory computer-readable medium of claim 16, wherein the pre-recorded images and the processed images are displayed so that the first indications of motion are displayed simultaneously with corresponding second indications of motion.

* * * * *